US010385752B2

(12) United States Patent
Matsumoto et al.

(10) Patent No.: US 10,385,752 B2
(45) Date of Patent: Aug. 20, 2019

(54) MALFUNCTION DIAGNOSIS APPARATUS AND MALFUNCTION DIAGNOSIS METHOD

(71) Applicant: TOYOTA JIDOSHA KABUSHIKI KAISHA, Toyota-shi, Aichi-ken (JP)

(72) Inventors: Arifumi Matsumoto, Gotenba (JP); Taiga Hagimoto, Susono (JP); Kenji Furui, Suntou-gun (JP); Makoto Ogiso, Mishima (JP); Toru Kidokoro, Hadano (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 450 days.

(21) Appl. No.: 15/179,026

(22) Filed: Jun. 10, 2016

(65) Prior Publication Data
US 2016/0369683 A1 Dec. 22, 2016

(30) Foreign Application Priority Data

Jun. 19, 2015 (JP) ................. 2015-124031

(51) Int. Cl.
*F01N 11/00* (2006.01)
*F01N 3/20* (2006.01)
(52) U.S. Cl.
CPC ............ *F01N 11/00* (2013.01); *F01N 3/208* (2013.01); *F01N 3/2066* (2013.01); *F01N 2550/05* (2013.01); *F01N 2560/026* (2013.01); *F01N 2610/02* (2013.01); *Y02T 10/24* (2013.01); *Y02T 10/47* (2013.01)

(58) Field of Classification Search
CPC .... F01N 11/00; F01N 3/2066; F01N 2610/02; F01N 2610/1406; F01N 2610/14
See application file for complete search history.

(56) References Cited

U.S. PATENT DOCUMENTS

2008/0103684 A1\* 5/2008 Allmer ............... B01D 53/9431
   701/114
2010/0257844 A1 10/2010 Shimomura et al.
(Continued)

FOREIGN PATENT DOCUMENTS

JP 2009-510324 3/2009
JP 2010174695 A \* 8/2010
(Continued)

*Primary Examiner* — Patrick D Maines
(74) *Attorney, Agent, or Firm* — Finnegan, Henderson, Farabow, Garrett & Dunner, LLP

(57) ABSTRACT

An amount of reducing agent adsorbed on a NOx catalyst when a reducing agent supply device is normal and a corresponding detected value may be estimated. The corresponding detected value may be detected by a NOx sensor, and the detected value may correspond to an amount of reducing agent adsorbed on the NOx catalyst. When the estimated amount of adsorption is larger than or equal to a first amount and is smaller than or equal to a second amount, a diagnosis of the NOx catalyst based on the detected value of the NOx sensor may be prevented. The first amount may be an amount of adsorbed reducing agent corresponding to a minimum value of the corresponding detected value. The second amount may be an amount of adsorbed reducing agent corresponding to the corresponding detected value when the amount of adsorbed reducing agent is zero and larger than the first amount.

18 Claims, 20 Drawing Sheets

(56) References Cited

U.S. PATENT DOCUMENTS

| | | | | |
|---|---|---|---|---|
| 2014/0360166 A1* | 12/2014 | Chandrasekaran | ..... | F01N 11/00 |
| | | | | 60/274 |
| 2015/0128564 A1* | 5/2015 | Upadhyay | ............. | F01N 3/2066 |
| | | | | 60/274 |
| 2015/0275733 A1* | 10/2015 | Matsumoto | ............. | F01N 11/00 |
| | | | | 60/277 |
| 2015/0315946 A1* | 11/2015 | Matsumoto | ........ | B01D 53/9495 |
| | | | | 422/119 |

FOREIGN PATENT DOCUMENTS

| | | | | |
|---|---|---|---|---|
| JP | 2010-248963 | 11/2010 | | |
| WO | WO 2007/037730 A1 | 4/2007 | | |
| WO | WO-2007037730 A1 * | 4/2007 | ........... | F01N 3/2066 |

* cited by examiner

MALFUNCTION DIAGNOSIS APPARATUS AND MALFUNCTION DIAGNOSIS METHOD

INCORPORATION BY REFERENCE

The disclosure of Japanese Patent Application No. 2015-124031, filed on Jun. 19, 2015, is incorporated herein by reference in its entirety.

BACKGROUND

Technical Field

Embodiments of the present disclosure relate to a malfunction diagnosis apparatus and a malfunction diagnosis method.

Description of Related Art

A NOx selective catalytic reduction catalyst (hereinafter, simply referred to as NOx catalyst) may purify NOx contained in exhaust gas from an internal combustion engine with the use of ammonia as a reducing agent. For example, an addition valve that adds ammonia or ammonia precursor into exhaust gas may be installed upstream of the NOx catalyst in the exhaust gas flow direction. An example of the ammonia precursor may be urea. Ammonia precursor or ammonia may also be collectively referred to as reducing agent.

Published Japanese Translation of PCT Application No. 2009-510324 (JP 2009-510324A) describes an exhaust aftertreatment system that may include a NOx sensor provided downstream of a NOx catalyst. The exhaust aftertreatment system described in JP 2009-510324A may determine that there is a malfunction in supply of reducing agent if a detected value of the NOx sensor remains unchanged or decreases at the time when an addition valve is operated such that the amount of reducing agent that is supplied to the NOx catalyst is increased. In the case where the amount of reducing agent supplied from the addition valve per unit time is reducing, the amount of supplied reducing agent may approach an appropriate value when the addition valve is operated such that the amount of supplied reducing agent increases. Therefore, a NOx purification rate decreases, with the result that the detected value of the NOx sensor decreases. When reducing agent is not supplied from the addition valve, reducing agent may not be supplied even when the addition valve is operated such that the amount of supplied reducing agent increases, so the detected value of the NOx sensor remains unchanged.

SUMMARY

A plurality of NOx catalysts may be provided along the flow of exhaust gas. A reducing agent may be supplied from a single addition valve to the plurality of NOx catalysts. That is, a reducing agent may be caused to flow out from the upstream NOx catalyst by supplying reducing agent in amount larger than or equal to an adsorbable amount of the upstream NOx catalyst. As a result, reducing agent may be supplied to the downstream NOx catalyst. A NOx sensor may be provided in an exhaust passage between the upstream NOx catalyst and the downstream NOx catalyst and reducing agent may be supplied on the basis of a detected value of the NOx sensor. In a configuration in which a NOx sensor and an ammonia slip catalyst that oxidizes ammonia are provided downstream of a NOx catalyst, reducing agent may be supplied on the basis of a detected value of the NOx sensor.

The NOx sensor may detect not only NOx, but also ammonia. When reducing agent flows out from the upstream NOx catalyst, the NOx sensor provided downstream of the upstream NOx catalyst may detect NOx and reducing agent. Therefore, when a diagnosis of whether there is a malfunction in a reducing agent supply device is carried out on the basis of a detected value of the NOx sensor, diagnostic accuracy may decrease unless the influence of reducing agent is taken into consideration.

Embodiments of the disclosure may provide a technique for preventing a decrease in diagnostic accuracy at the time when a diagnosis of whether there is a malfunction in a reducing agent supply device is carried out on the basis of a detected value of a NOx sensor provided downstream of a NOx selective catalytic reduction catalyst.

An example aspect of the present disclosure provides a malfunction diagnosis apparatus for an exhaust emission control system of an internal combustion engine. The exhaust emission control system may include a reducing agent supply device, a NOx selective catalytic reduction catalyst, and a NOx sensor. The reducing agent supply device may be provided in an exhaust passage of the internal combustion engine, and the reducing agent supply device may be configured to supply ammonia precursor or ammonia into the exhaust passage as reducing agent. The NOx selective catalytic reduction catalyst may be provided in the exhaust passage downstream of the reducing agent supply device in a flow direction of exhaust gas, and the NOx selective catalytic reduction catalyst may be configured to selectively reduce NOx by using reducing agent that is adsorbed on the NOx selective catalytic reduction catalyst. The NOx sensor may be provided in the exhaust passage downstream of the NOx selective catalytic reduction catalyst in the flow direction of exhaust gas, and the NOx sensor may be configured to detect NOx and ammonia. The malfunction diagnosis apparatus may include an electronic control unit. The electronic control unit may be configured (e.g., programmed) to: carry out a diagnosis of whether there is a malfunction in the reducing agent supply device based on a detected value of the NOx sensor; estimate an estimated amount of adsorption when the reducing agent supply device is normal, the estimated amount of adsorption being an estimated amount of reducing agent adsorbed on the NOx selective catalytic reduction catalyst; estimate a corresponding detected value, the corresponding detected value being a detected value of the NOx sensor, the detected value of the NOx sensor corresponding to the amount of reducing agent adsorbed on the NOx selective catalytic reduction catalyst; and prohibit (i.e., prevent) the diagnosis based on the detected value of the NOx sensor when the estimated amount of adsorption is larger than or equal to a first amount of adsorption and smaller than or equal to a second amount of adsorption, the first amount of adsorption being an amount of adsorbed reducing agent corresponding to a minimum value of the corresponding detected value, the second amount of adsorption being an amount of adsorbed reducing agent corresponding to the corresponding detected value same as a first detected value, the first detected value being the corresponding detected value when the amount of adsorbed reducing agent is zero, the second amount of adsorption being an amount of adsorbed reducing agent larger than the first amount of adsorption.

The electronic control unit may carry out a diagnosis of whether there is such a malfunction that the amount of reducing agent supplied from the reducing agent supply device reduces, by, for example, comparing an actual detected value of the NOx sensor with the threshold. The magnitude relation between the actual detected value of the NOx sensor and the threshold can change depending on the set threshold. The estimated amount of adsorption may be the amount of reducing agent adsorbed on the NOx catalyst in the case where the reducing agent supply device is normal. The corresponding detected value may be a detected value of the NOx sensor, and the detected value of the NOx sensor may correspond to each amount of adsorbed reducing agent. The electronic control unit may estimate the detected value of the NOx sensor, corresponding to the amount of adsorbed reducing agent, for each amount of adsorbed reducing agent. The electronic control unit may estimate the detected value of the NOx sensor within the range of the amount of reducing agent that is adsorbable on the NOx catalyst. When there occurs a malfunction in the reducing agent supply device, the amount of supplied reducing agent may reduce in response to the degree of malfunction, so the amount of adsorbed reducing agent reduces in response to the degree of malfunction. Therefore, the electronic control unit may estimate the detected value of the NOx sensor, corresponding to the amount of adsorbed reducing agent that has changed in response to the degree of malfunction, for each amount of adsorbed reducing agent. Within the range of the amount of reducing agent that can be adsorbed on the NOx catalyst, the corresponding detected value may have a minimum value. The minimum value of the corresponding detected value can change depending on, for example, the operating state of the internal combustion engine.

The NOx sensor may detect NOx and ammonia. When the amount of reducing agent adsorbed on the NOx catalyst is zero or relatively small, NOx that has not been reduced in the NOx catalyst may pass through the NOx catalyst, so NOx is detected by the NOx sensor. As the amount of adsorbed reducing agent increases, the amount of NOx reduced in the NOx catalyst may increase, so the detected value of the NOx sensor reduces. On the other hand, as the amount of adsorbed reducing agent increases, the amount of reducing agent flowing out from the NOx catalyst may increase. For this reason, in the relationship between the amount of adsorbed reducing agent and the detected value of the NOx sensor (corresponding detected value), there may be the amount of adsorbed reducing agent at which the detected value of the NOx sensor is a minimum value. This amount of adsorbed reducing agent at which the detected value of the NOx sensor is a minimum value may be set as the first amount of adsorption.

When the estimated amount of adsorption falls within the range smaller than the first amount of adsorption, NOx flowing out from the NOx catalyst may increase as the amount of adsorbed reducing agent reduces as a result of occurrence of a malfunction in the reducing agent supply device. Therefore, the actual detected value of the NOx sensor may be constantly larger than the detected value of the NOx sensor, corresponding to the estimated amount of adsorption. It is possible to carry out a diagnosis of whether there is a malfunction in the reducing agent supply device on the basis of this relationship.

When the estimated amount of adsorption falls within the range larger than the second amount of adsorption, the amount of reducing agent flowing out from the NOx catalyst may reduce as the amount of adsorbed reducing agent reduces as a result of occurrence of a malfunction in the reducing agent supply device. Therefore, the actual detected value of the NOx sensor may be constantly smaller than the detected value of the NOx sensor, corresponding to the estimated amount of adsorption. It is possible to carry out a diagnosis of whether there is a malfunction in the reducing agent supply device on the basis of this relationship.

When the estimated amount of adsorption falls within the range larger than or equal to the first amount of adsorption and smaller than or equal to the second amount of adsorption, as the amount of adsorbed reducing agent reduces as a result of occurrence of a malfunction in the reducing agent supply device, the corresponding detected value may reduce as the amount of adsorbed reducing agent reduces within the range from the estimated amount of adsorption to the first amount of adsorption. However, when the amount of adsorbed reducing agent becomes smaller than the first amount of adsorption, the corresponding detected value may increase as the amount of adsorbed reducing agent reduces. For this reason, when the amount of adsorbed reducing agent has reduced as a result of occurrence of a malfunction in the reducing agent supply device, the actual detected value of the NOx sensor may become larger than the detected value of the NOx sensor, corresponding to the estimated amount of adsorption, or may become smaller than the detected value of the NOx sensor, corresponding to the estimated amount of adsorption. For this reason, it may become difficult to carry out a diagnosis of whether there is a malfunction in the reducing agent supply device on the basis of the detected value of the NOx sensor. Therefore, in such a case, a diagnosis utilizing the detected value of the NOx sensor may be prohibited. Thus, it is possible to prevent or reduce a decrease in diagnostic accuracy at the time of carrying out a diagnosis of whether there is a malfunction in the reducing agent supply device.

In the malfunction diagnosis apparatus, the electronic control unit may be configured to set a value smaller than the detected value of the NOx sensor, the detected value of the NOx sensor may correspond to the estimated amount of adsorption, as a threshold, when the estimated amount of adsorption is larger than the second amount of adsorption, and the electronic control unit may be configured to diagnose the reducing agent supply device as being malfunction when the detected value of the NOx sensor is smaller than or equal to the threshold.

In the case where the estimated amount of adsorption falls within the above-described range, when there occurs a malfunction in the reducing agent supply device, the actual detected value of the NOx sensor may be constantly smaller than the detected value of the NOx sensor, corresponding to the estimated amount of adsorption. Therefore, when a value smaller than the detected value of the NOx sensor, corresponding to the estimated amount of adsorption, is set as the threshold, it is possible to diagnose the reducing agent supply device as being malfunction when the actual detected value of the NOx sensor becomes smaller than the threshold. The threshold may be a value smaller than the detected value of the NOx sensor, corresponding to the estimated amount of adsorption, and the detected value of the NOx sensor at the boundary as to whether there is a malfunction in the reducing agent supply device. The threshold may be a predetermined value or may be set in response to the estimated amount of adsorption. For example, a value smaller by a set amount or a set percentage than the detected value of the NOx sensor, corresponding to the estimated amount of adsorption, may be set as the threshold.

In the malfunction diagnosis apparatus, the electronic control unit may be configured to prohibit the diagnosis based on the detected value of the NOx sensor, when the estimated amount of adsorption is larger than the second amount of adsorption and the threshold is smaller than or equal to the first detected value.

When the threshold is smaller than or equal to the first detected value, the actual amount of adsorbed reducing agent may be larger than the first amount of adsorption or may be smaller than the first amount of adsorption. For this reason, it is possible to prevent or reduce a decrease in diagnostic accuracy by prohibiting a diagnosis utilizing the detected value of the NOx sensor.

In the malfunction diagnosis apparatus, the electronic control unit may be configured to diagnose the reducing agent supply device as being malfunction when the estimated amount of adsorption is larger than the second amount of adsorption and the detected value of the NOx sensor is smaller than or equal to the first detected value.

When the estimated amount of adsorption is larger than the second amount of adsorption, the actual detected value of the NOx sensor may be constantly larger than the first detected value when the reducing agent supply device is normal. On the other hand, when the reducing agent supply device is malfunction, the actual detected value of the NOx sensor can be smaller than the first detected value. That is, by using the first detected value as the threshold as well, it is possible to carry out a diagnosis of whether there is a malfunction in the reducing agent supply device.

In the malfunction diagnosis apparatus, the electronic control unit may be configured to execute a first control for changing the corresponding detected value or the estimated amount of adsorption by changing at least one of the concentration of NOx in exhaust gas flowing into the NOx selective catalytic reduction catalyst or the amount of reducing agent supplied from the reducing agent supply device, when the diagnosis based on the detected value of the NOx sensor has been prohibited. The electronic control unit may be configured to permit the diagnosis based on the detected value of the NOx sensor when the estimated amount of adsorption becomes smaller than the first amount of adsorption or becomes larger than the second amount of adsorption as a result of executing the first control.

The amount of reducing agent adsorbed on the NOx catalyst may increase as a result of an increase in the amount of supplied reducing agent, so the estimated amount of adsorption also increases. Therefore, the estimated amount of adsorption can be larger than the second amount of adsorption. On the other hand, the amount of reducing agent adsorbed on the NOx catalyst may reduce as a result of a reduction in the amount of supplied reducing agent, so the estimated amount of adsorption also reduces. Therefore, the estimated amount of adsorption can be smaller than the first amount of adsorption. In this case, the estimated amount of adsorption may fall outside the range in which a diagnosis that is carried out by a diagnosing unit by utilizing the detected value of the NOx sensor is prohibited. The concentration of NOx in exhaust gas flowing out from the NOx catalyst may increase as a result of an increase in the concentration of NOx in exhaust gas flowing into the NOx catalyst, so the detected value of the NOx sensor increases. In this case, the corresponding detected value to be estimated may increase, and the first amount of adsorption and the second amount of adsorption can change. Similarly, the corresponding detected value to be estimated may reduce as a result of a reduction in the concentration of NOx in exhaust gas flowing into the NOx catalyst, so the first amount of adsorption and the second amount of adsorption can change. In this way, by increasing or reducing the concentration of NOx in exhaust gas flowing into the NOx catalyst, the relationship between the estimated amount of adsorption and each of the first amount of adsorption and the second amount of adsorption changes. In this case, the estimated amount of adsorption may fall outside the range in which a diagnosis utilizing the detected value of the NOx sensor is prohibited. In this case, an accurate diagnosis is possible if a diagnosis is permitted. Therefore, it is possible to increase an opportunity of diagnosis by carrying out a diagnosis.

In the malfunction diagnosis apparatus, the electronic control unit may be configured to execute a first control for changing the corresponding detected value or the estimated amount of adsorption by changing at least one of the concentration of NOx in exhaust gas flowing into the NOx selective catalytic reduction catalyst or the amount of reducing agent supplied from the reducing agent supply device, when the diagnosis based on the detected value of the NOx sensor has been prohibited, and the electronic control unit may be configured to permit the diagnosis based on the detected value of the NOx sensor when the threshold becomes larger than the first detected value as a result of executing the first control.

The threshold may become larger than the first detected value as a result of a change in the minimum value of the corresponding detected value or a change in the detected value of the NOx sensor, corresponding to the minimum value of the corresponding detected value. In this case, an accurate diagnosis is possible if a diagnosis is permitted. Therefore, it is possible to increase an opportunity of diagnosis by carrying out a diagnosis.

In the malfunction diagnosis apparatus, the electronic control unit may be configured to estimate the corresponding detected value based on an amount of reducing agent flowing out from the NOx selective catalytic reduction catalyst, an amount of NOx flowing into the NOx selective catalytic reduction catalyst, a temperature of the NOx selective catalytic reduction catalyst, an amount of reducing agent adsorbed on the NOx selective catalytic reduction catalyst and an exhaust gas flow rate.

The NOx sensor may detect NOx and reducing agent flowing out from the NOx catalyst. The concentration of NOx in exhaust gas flowing out from the NOx catalyst may correlate with the concentration of NOx in exhaust gas flowing into the NOx catalyst, the temperature of the NOx catalyst, the amount of reducing agent adsorbed on the NOx catalyst and the exhaust gas flow rate. The concentration of NOx in exhaust gas flowing into the NOx catalyst may be calculated on the basis of the amount of NOx in exhaust gas flowing into the NOx catalyst and the exhaust gas flow rate. The concentration of reducing agent in exhaust gas flowing out from the NOx catalyst may correlate with the temperature of the NOx catalyst and the amount of reducing agent adsorbed on the NOx catalyst. Therefore, it is possible to estimate the detected value of the NOx sensor by utilizing these relationships.

Another example aspect of the present disclosure may provide a malfunction diagnosis method for an exhaust emission control system of an internal combustion engine. The exhaust emission control system may include a reducing agent supply device, a NOx selective catalytic reduction catalyst and a NOx sensor, and the reducing agent supply device may be provided in an exhaust passage of the internal combustion engine. The reducing agent supply device may be configured to supply ammonia precursor or ammonia into the exhaust passage as reducing agent, the NOx selective catalytic reduction catalyst may be provided in the exhaust passage downstream of the reducing agent supply device in a flow direction of exhaust gas, the NOx selective catalytic reduction catalyst may be configured to selectively reduce NOx by using reducing agent that is adsorbed on the NOx selective catalytic reduction catalyst, the NOx sensor may be provided in the exhaust passage downstream of the NOx selective catalytic reduction catalyst in the flow direction of exhaust gas, the NOx sensor may be configured to detect NOx and ammonia, and the malfunction diagnosis method may include: carrying out a diagnosis of whether there is a malfunction in the reducing agent supply device based on a detected value of the NOx sensor; estimating an estimated amount of adsorption when the reducing agent supply device is normal, the estimated amount of adsorption being an estimated amount of reducing agent adsorbed on the NOx selective catalytic reduction catalyst; estimating a corresponding detected value, the selective catalytic reduction catalyst being a detected value of the NOx sensor, the detected value of the NOx sensor corresponding to the amount of reducing agent adsorbed on the NOx selective catalytic reduction catalyst; and prohibiting the diagnosis based on the detected value of the NOx sensor when the estimated amount of adsorption is larger than or equal to a first amount of adsorption and smaller than or equal to a second amount of adsorption, the first amount of adsorption being an amount of adsorbed reducing agent corresponding to a minimum value of the corresponding detected value, the second amount of adsorption being an amount of adsorbed reducing agent corresponding to the corresponding detected value same as a first detected value, the first detected value being the corresponding detected value when the amount of adsorbed reducing agent is zero, the second amount of adsorption being an amount of adsorbed reducing agent larger than the first amount of adsorption.

According to the present disclosure, it is possible to prevent or reduce a decrease in diagnostic accuracy at the time of carrying out a diagnosis of whether there is a malfunction in the reducing agent supply device on the basis of the detected value of the NOx sensor provided downstream of the NOx selective catalytic reduction catalyst.

BRIEF DESCRIPTION OF THE DRAWINGS

Embodiments of the present disclosure will be described below with reference to the accompanying drawings, in which like numerals denote like elements, and wherein.

DETAILED DESCRIPTION

Embodiments of the present disclosure will be described with reference to the accompanying drawings. However, the scope of the disclosure is not intended to be limited to the dimensions, materials, shapes, relative arrangement, and the like, of components described in the embodiments unless otherwise specified. The following embodiments may be combined with each other wherever possible.

Figure 1:
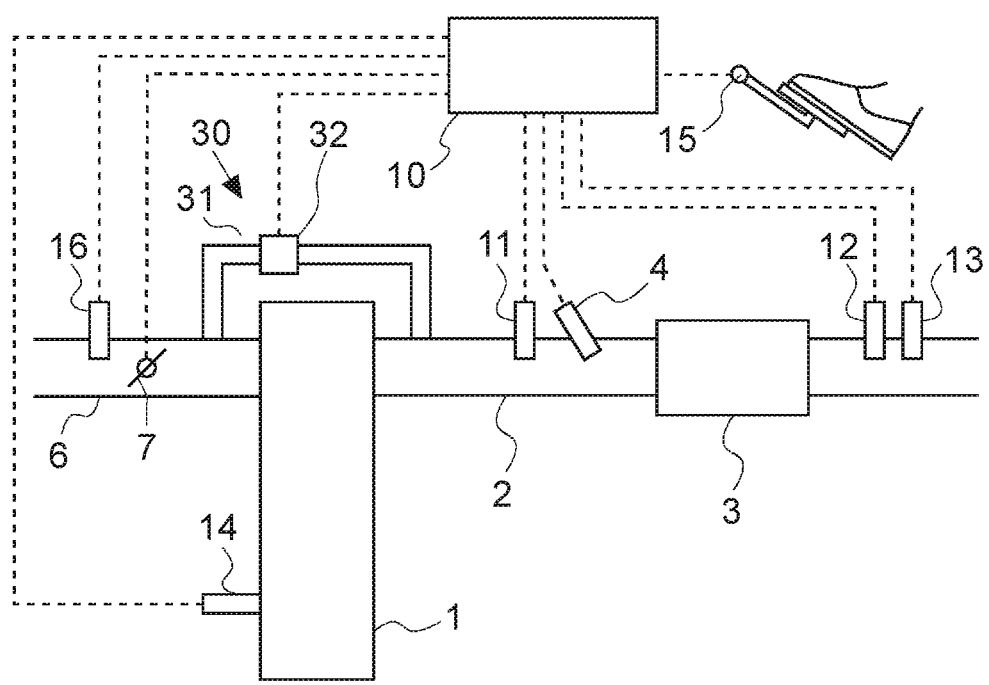
FIG. 1 shows the schematic configuration of an internal combustion engine and an intake system and exhaust system of the internal combustion engine according to a first embodiment of the present disclosure.

FIG. 1 is a view that shows the schematic configuration of an internal combustion engine and an intake system and exhaust system of the internal combustion engine according to the first embodiment of the present disclosure. The internal combustion engine 1 may be a diesel engine for propelling a vehicle. However, the internal combustion engine 1 may be a gasoline engine. An exhaust passage 2 is connected to the internal combustion engine 1. A NOx selective catalytic reduction catalyst 3 (hereinafter, referred to as NOx catalyst 3) may be provided in the exhaust passage 2. The NOx catalyst 3 may selectively reduce NOx in exhaust gas with the use of ammonia as reducing agent.

An addition valve 4 may be provided in the exhaust passage 2 upstream of the NOx catalyst 3 in the exhaust gas flow direction (exhaust passage 2 that connects the internal combustion engine 1 with the NOx catalyst 3). The addition valve 4 may inject reducing agent. Ammonia ($NH_3$) may be used as the reducing agent. The addition valve 4 may inject urea aqueous solution instead of ammonia. Urea aqueous solution may be ammonia precursor. Urea aqueous solution injected from the addition valve 4 may be hydrolyzed into ammonia by the heat of exhaust gas or heat from the NOx catalyst 3, and may be adsorbed onto the NOx catalyst 3. This ammonia may be utilized as reducing agent in the NOx catalyst 3. That is, ammonia or a substance that transforms into ammonia may be supplied from the addition valve 4. These may be supplied in any one of a gaseous state, a liquid state and a solid state. The addition valve 4 is an example of a reducing agent supply device.

An upstream NOx sensor 11 may be provided upstream of the addition valve 4 in the exhaust gas flow direction. The upstream NOx sensor 11 may detect NOx in exhaust gas flowing into the NOx catalyst 3. A downstream NOx sensor 12 and a temperature sensor 13 may be provided downstream of the NOx catalyst 3 in the exhaust gas flow direction. The downstream NOx sensor 12 may detect NOx in exhaust gas flowing out from the NOx catalyst 3. The temperature sensor 13 may detect an exhaust gas temperature. The downstream NOx sensor 12 is an example of a NOx sensor.

An intake passage 6 may be connected to the internal combustion engine 1. A throttle 7 may be provided in the intake passage 6. The throttle 7 may adjust the intake air amount of the internal combustion engine 1. An air flow meter 16 may be attached to the intake passage 6 upstream of the throttle 7. The air flow meter 16 may detect the intake air amount of the internal combustion engine 1.

The internal combustion engine 1 may include an EGR device 30. The EGR device 30 may recirculate part of exhaust gas flowing through the exhaust passage 2 (hereinafter, referred to as EGR gas) to the intake passage 6. The EGR device 30 may include an EGR passage 31 and an EGR valve 32. The EGR passage 31 may connect the exhaust passage 2 upstream of the NOx catalyst 3 with the intake passage 6 downstream of the throttle 7. EGR gas may be recirculated through the EGR passage 31. The EGR valve 32 may adjust the amount of EGR gas flowing through the EGR passage 31 by adjusting the passage cross-sectional area of the EGR passage 31.

An ECU 10 may be provided in association with the internal combustion engine 1. The ECU 10 may be an electronic control unit (e.g., programmed to perform one or more of the functions described herein). The ECU 10 may control the operating state of the internal combustion engine 1, an exhaust emission control system, and the like. The upstream NOx sensor 11, the downstream NOx sensor 12, the temperature sensor 13, the air flow meter 16, a crank position sensor 14 and an accelerator operation amount sensor 15 may be electrically connected to the ECU 10. The ECU 10 may receive output values of the sensors.

The ECU 10 may be configured to acquire the operating state of the internal combustion engine 1, such as an engine rotation speed based on detection of the crank position sensor 14 and an engine load based on detection of the accelerator operation amount sensor 15. In the present embodiment, NOx in exhaust gas flowing into the NOx catalyst 3 may be detectable by the upstream NOx sensor 11. However, NOx contained in exhaust gas that is emitted from the internal combustion engine 1 (exhaust gas not yet purified by the NOx catalyst 3, that is, exhaust gas flowing into the NOx catalyst 3) may be in relation with the operating state of the internal combustion engine 1. Therefore, NOx contained in exhaust gas that is emitted from the internal combustion engine 1 may be estimated on the basis of the operating state of the internal combustion engine 1. The ECU 10 may be able to estimate the temperature of the NOx catalyst 3 on the basis of an exhaust gas temperature that is detected by the temperature sensor 13. The ECU 10 may also be able to estimate the temperature of the NOx catalyst 3 on the basis of the operating state of the internal combustion engine 1. On the other hand, the addition valve 4, the throttle 7 and the EGR valve 32 may be connected to the ECU 10 via electric wiring. Thus, these devices may be controlled by the ECU 10.

Figure 2:
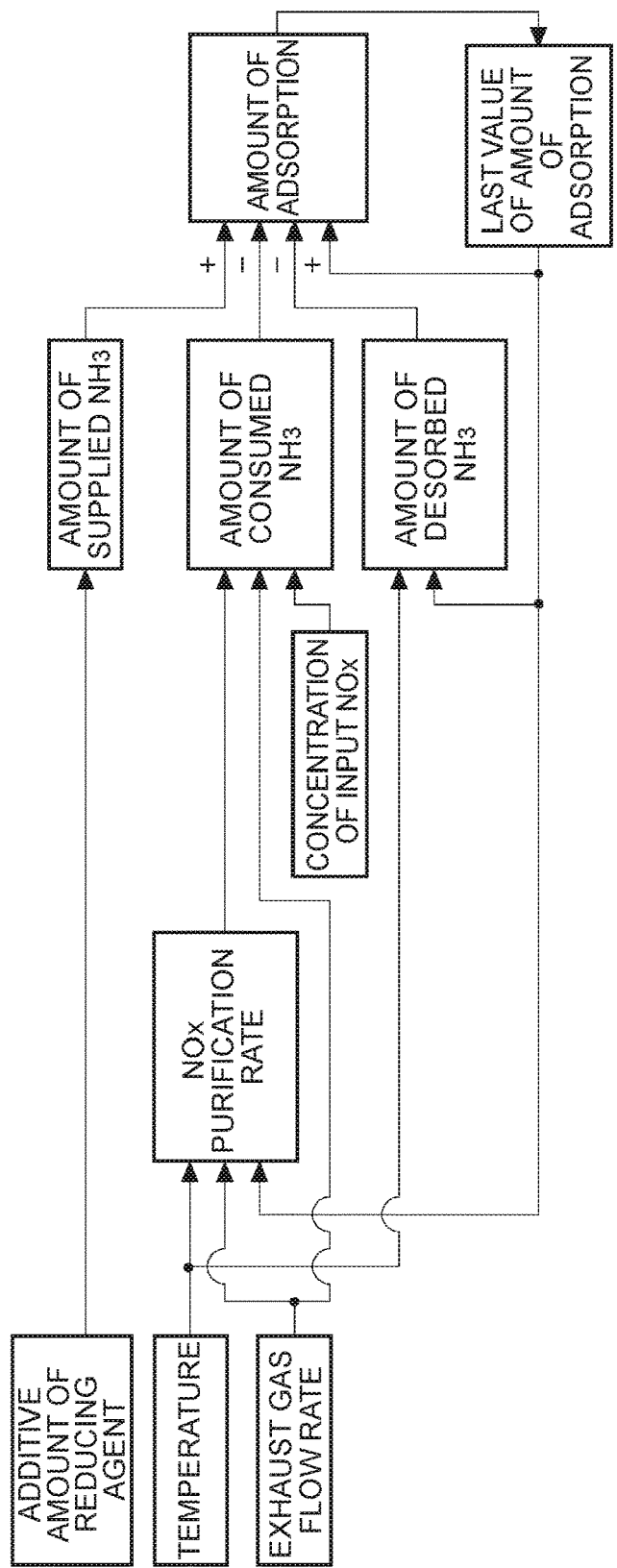
FIG. 2 is a block diagram for obtaining an estimated amount of adsorption in a NOx catalyst according to the first embodiment.

The ECU 10 may estimate the amount of ammonia adsorbed on the NOx catalyst 3. The amount of ammonia adsorbed on the NOx catalyst 3, which is estimated by the ECU 10, is hereinafter referred to as the estimated amount of adsorption. The estimated amount of adsorption may be the amount of adsorbed ammonia at current point in time, which may be calculated on the assumption that the addition valve 4 is normal. FIG. 2 is a block diagram for obtaining the estimated amount of adsorption on the NOx catalyst 3. In the present embodiment, the ECU 10 may obtain the estimated amount of adsorption by integrating the amount of change in the amount of ammonia adsorbed on the NOx catalyst 3 per unit time. The amount of change in the amount of ammonia adsorbed on the NOx catalyst 3 per unit time may be obtained by subtracting the amount of reduction in the amount of adsorbed ammonia per unit time from the amount of increase in the amount of adsorbed ammonia per unit time. The amount of increase in the amount of ammonia adsorbed on the NOx catalyst 3 per unit time may be regarded as the amount of reducing agent that is added from the addition valve 4 per unit time (the amount of supplied $NH_3$ in FIG. 2). The amount of reduction in the amount of ammonia adsorbed on the NOx catalyst 3 per unit time may be regarded as the amount of reducing agent that is consumed in the NOx catalyst 3 per unit time (the amount of consumed $NH_3$ in FIG. 2) and the amount of reducing agent that desorbs from the NOx catalyst 3 per unit time (the amount of desorbed $NH_3$ in FIG. 2). The ECU 10 may calculate the amount of adsorbed ammonia (the amount of adsorption in FIG. 2) at current point in time by integrating the amount of change in the amount of ammonia adsorbed on the NOx catalyst 3 per unit time.

The amount of reducing agent that is added from the addition valve 4 per unit time (the amount of supplied $NH_3$ in FIG. 2) may be obtained in advance on the basis of the amount of supplied reducing agent, which is calculated by the ECU 10 on the basis of the operating state of the internal combustion engine 1. The amount of reducing agent that is consumed in the NOx catalyst 3 per unit time (the amount of consumed $NH_3$ in FIG. 2) may be linked with a NOx purification rate (NOx purification rate in FIG. 2) in the NOx catalyst 3, the flow rate of exhaust gas from the internal combustion engine 1 per unit time (exhaust gas flow rate in FIG. 2) and the concentration of NOx in exhaust gas flowing into the NOx catalyst 3 (the concentration of input NOx in FIG. 2). Therefore, the amount of reducing agent that is consumed in the NOx catalyst 3 per unit time may be calculated on the basis of these values. The exhaust gas flow rate may be calculated on the basis of an intake air amount and a fuel injection amount or may be detected by a sensor.

The NOx purification rate may be the amount of NOx that is purified in the NOx catalyst 3 with respect to the amount of NOx in exhaust gas flowing into the NOx catalyst 3 (which may be the concentration of NOx). The NOx purification rate may be linked with the temperature of the NOx catalyst 3 (temperature in FIG. 2), the exhaust gas flow rate, and the amount of ammonia adsorbed on the NOx catalyst 3 (a last value of the amount of adsorption in FIG. 2). Therefore, the NOx purification rate may be calculated on the basis of these values. A value calculated last time may be used as the amount of ammonia adsorbed on the NOx catalyst 3. The NOx purification rate in the NOx catalyst 3 may correlate with the temperature of the NOx catalyst 3, the exhaust gas flow rate and the amount of ammonia adsorbed on the NOx catalyst 3. Therefore, the NOx purification rate may be calculated by obtaining the relationship among these in advance by experiment, simulation, or the like. The relationship among these may be mapped in advance.

The amount of reducing agent that desorbs from the NOx catalyst 3 per unit time (the amount of desorbed $NH_3$ in FIG. 2) may be linked with the temperature of the NOx catalyst 3 (temperature in FIG. 2) and the amount of ammonia adsorbed on the NOx catalyst 3 (a last value of the amount of adsorption in FIG. 2). Therefore, the amount of reducing agent that desorbs from the NOx catalyst 3 per unit time may be calculated on the basis of these values. When the relationship among the temperature of the NOx catalyst 3, the amount of adsorbed ammonia and the amount of desorbed $NH_3$ is obtained in advance by experiment, simulation, or the like, the amount of desorbed $NH_3$ may be obtained on the basis of the temperature of the NOx catalyst 3 and the amount of adsorbed ammonia. The relationship among these may be mapped in advance.

As described above, the amount of change in the amount of ammonia adsorbed on the NOx catalyst 3 per unit time may be calculated. The amount of adsorbed ammonia at current point in time may be calculated by integrating this value. The amount of adsorbed ammonia at current point in time may be calculated by calculating the amount of change in the amount of adsorbed ammonia at computation intervals of the ECU 10 and integrating the amount of change.

The ECU 10 may estimate a detected value of the downstream NOx sensor 12 on the basis of the concentration of NOx in exhaust gas flowing out from the NOx catalyst 3 and the concentration of ammonia in exhaust gas flowing out from the NOx catalyst 3. The NOx sensor may detect NOx and ammonia, so a value obtained by adding the concentration of NOx in exhaust gas flowing out from the NOx catalyst 3 and the concentration of ammonia in exhaust gas flowing out from the NOx catalyst 3 may be the detected value of the downstream NOx sensor 12. The concentration of ammonia in exhaust gas flowing out from the NOx catalyst 3 (hereinafter, also referred to as the concentration of output $NH_3$) may be calculated on the basis of the amount of desorbed $NH_3$ and the exhaust gas flow rate in FIG. 2. The concentration of NOx in exhaust gas flowing out from the NOx catalyst 3 (hereinafter, also referred to as the concentration of output NOx) may be calculated on the basis of the concentration of input NOx and the NOx purification rate in FIG. 2 with the use of the following mathematical expression. Concentration of Output NOx=Concentration of Input NOx·(1−NOx Purification Rate) By adding the concentration of output NOx and the concentration of output $NH_3$, the detected value of the downstream NOx sensor 12 may be estimated. An estimated value of the detected value of the downstream NOx sensor 12, which corresponds to the estimated amount of adsorption, may be hereinafter also referred to as estimated detected sensor value.

The ECU 10 carries out a malfunction diagnosis of the addition valve 4 on the basis of the detected value of the downstream NOx sensor 12 (hereinafter, also referred to as detected sensor value). The malfunction of the addition valve 4 may be such a malfunction that the amount of reducing agent supplied from the addition valve 4 per unit time reduces. A reduction in the amount of reducing agent supplied per unit time may include the case where the amount of supplied reducing agent reduces as compared to that during normal times and the case where the amount of supplied reducing agent becomes zero. For example, because reducing agent or PM may fixedly adhere to the addition valve 4, the amount of reducing agent supplied per unit time may reduce. As there occurs a malfunction in the addition valve 4, reducing agent may become insufficient in the NOx catalyst 3, so the amount of NOx that is not reduced in the NOx catalyst 3 and that flows out from the NOx catalyst 3 increases. Therefore, when the amount of NOx or the concentration of NOx downstream of the NOx catalyst 3 exceeds a normal range, it may be determined that there is a malfunction in the addition valve 4. The fact that there is no malfunction in other devices other than the addition valve 4 should be verified with the use of a known technique.

However, when NOx flowing out from the NOx catalyst 3 is detected by the downstream NOx sensor 12, the downstream NOx sensor 12 may also detect ammonia. Therefore, when ammonia is flowing out from the NOx catalyst 3, the detected sensor value may increase.

Figure 3:
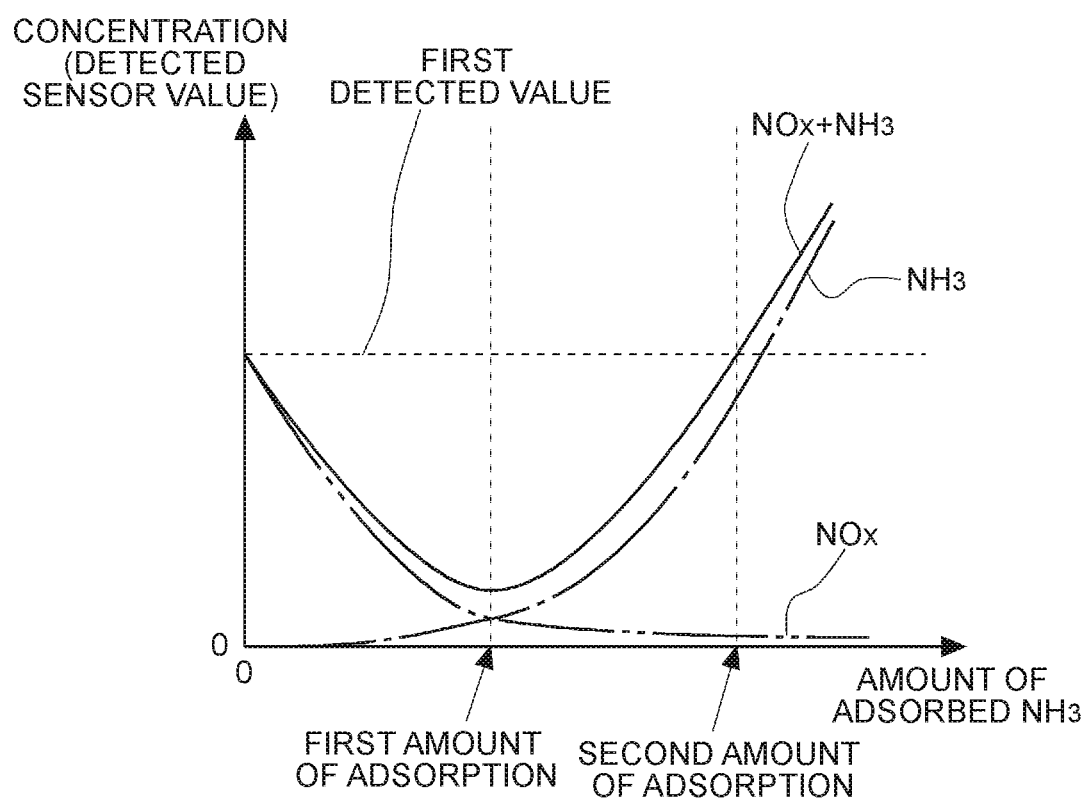
FIG. 3 is a graph that shows the relationship between the amount of adsorbed ammonia and the concentration of NOx and ammonia flowing out from the NOx catalyst according to the first embodiment.

FIG. 3 is a graph that shows the relationship between the amount of adsorbed ammonia and the concentrations of NOx and ammonia flowing out from the NOx catalyst 3. In FIG. 3, $NH_3$ denotes the concentration of ammonia, NOx denotes the concentration of NOx, and $NH_3$+NOx denotes the sum of the concentration of NOx and the concentration of ammonia. $NH_3$+NOx is a value obtained by adding the concentration of NOx and the concentration of ammonia together, and is also regarded as the detected sensor value, so $NH_3$+NOx is hereinafter described as the detected sensor value. The continuous line in FIG. 3 is also regarded as indicating the detected sensor value corresponding to each amount of adsorbed ammonia. The detected sensor value that corresponds to each amount of adsorbed ammonia and that is obtained from the continuous line shown in FIG. 3 is an example of a corresponding detected value.

Figure 4:
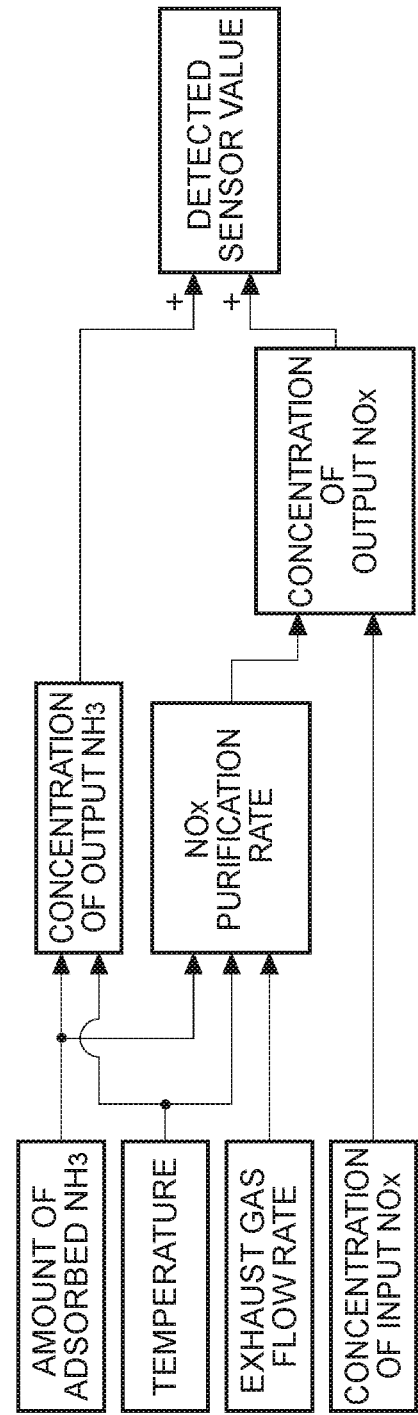
FIG. 4 is a block diagram for estimating a detected sensor value according to the first embodiment.

The concentration of output NOx and the concentration of output $NH_3$ may be determined on the basis of the amount of ammonia adsorbed on the NOx catalyst 3 as described with reference to FIG. 2. That is, as the amount of adsorbed ammonia increases, the concentration of output $NH_3$ increases, and the concentration of output NOx may reduce. As the amount of adsorbed ammonia reduces, the concentration of output $NH_3$ reduces, and the concentration of output NOx may increase. As the temperature of the NOx catalyst 3 rises, the concentration of output $NH_3$ may increase. When the temperature of the NOx catalyst 3 falls within a predetermined temperature range (for example, the range higher than or equal to 250° C. and lower than or equal to 350° C.), the NOx purification rate may increase. When the temperature of the NOx catalyst 3 falls outside the predetermined temperature range, the NOx purification rate may decrease. As the amount of adsorbed ammonia increases, the NOx purification rate may increase. As the exhaust gas flow rate increases, the NOx purification rate may decrease. This relationship may be obtained as shown in FIG. 4 in advance by experiment, simulation, or the like. FIG. 4 is a block diagram for estimating the detected sensor value. The relationship shown in FIG. 3 may be stored in the ECU 10 as a map, a mathematical expression, a model, or the like. A map may be created as needed or, as will be described later, an estimated detected sensor value and an actual detected sensor value may be compared with each other without preparing a map. As the amount of adsorbed ammonia increases, the NOx purification rate increases, so the concentration of NOx may decrease. On the other hand, as the amount of adsorbed ammonia increases, ammonia desorbs from the NOx catalyst 3, so the concentration of ammonia may increase. The detected sensor value may have a local minimum value. The amount of adsorbed ammonia at which the detected sensor value becomes a local minimum value may be defined as a first amount of adsorption. As the amount of ammonia adsorbed on the NOx catalyst 3 reduces with respect to the first amount of adsorption, the detected sensor value increases. As the amount of ammonia adsorbed on the NOx catalyst 3 increases with respect to the first amount of adsorption, the detected sensor value may increase.

In FIG. 3, when the amount of adsorbed ammonia is zero, it may not be possible to reduce NOx in the NOx catalyst 3 and no ammonia may flow out from the NOx catalyst 3, so the detected sensor value indicates the concentration of NOx. The detected sensor value at the time when the amount of adsorbed ammonia is zero is also hereinafter referred to as first detected value. The first detected value may be equal to the concentration of NOx flowing into the NOx catalyst 3. That is, the first detected value may be equal to the detected value of the upstream NOx sensor 11.

In FIG. 3, the amount of adsorbed ammonia at the time when the detected sensor value may be the same value as the first detected value in the case where the amount of adsorbed ammonia is larger than the first amount of adsorption is hereinafter referred to as second amount of adsorption. In the present embodiment, three divided ranges, that is, a first range, a second range and a third range, may be defined depending on the amount of ammonia adsorbed on the NOx catalyst 3. In FIG. 3, the range in which the amount of adsorbed ammonia is larger than or equal to zero and smaller than the first amount of adsorption is the first range, the range in which the amount of adsorbed ammonia is larger than or equal to the first amount of adsorption and smaller than or equal to the second amount of adsorption is the second range, and the range in which the amount of adsorbed ammonia is larger than the second amount of adsorption is the third range. When the amount of adsorbed ammonia falls within the second range, the ECU 10 may prohibit a malfunction diagnosis of the addition valve 4. Hereinafter, each of the first range, the second range and the third range will be described.

Figure 5:
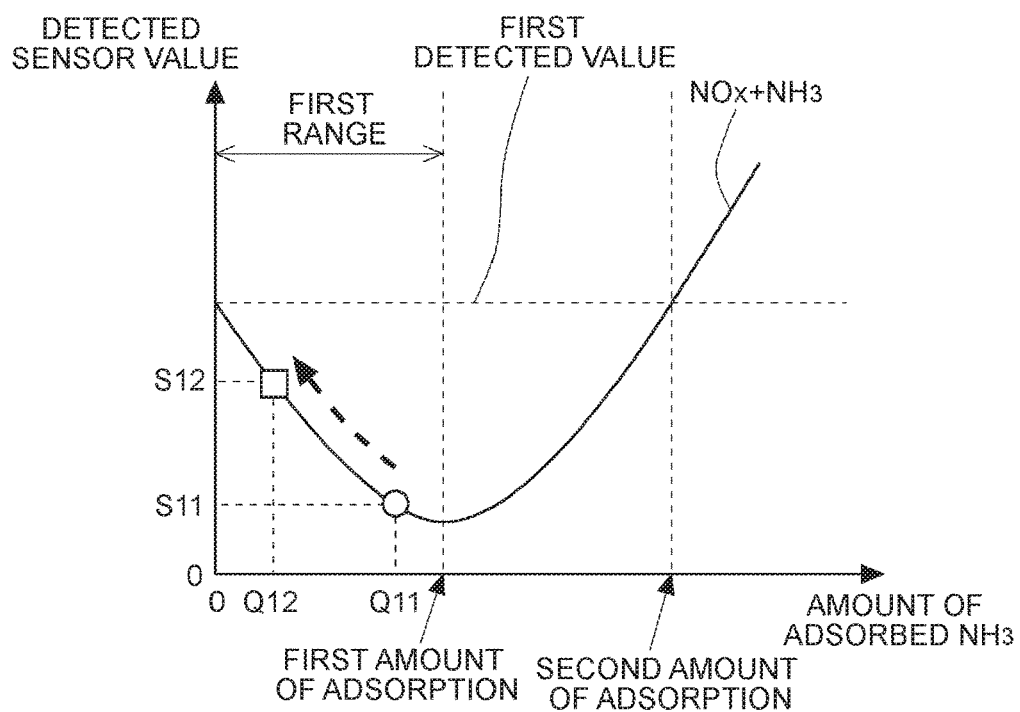
FIG. 5 is a graph that shows the relationship between the amount of adsorbed ammonia and a detected sensor value in the case where the amount of adsorbed ammonia at the time when an addition valve is normal falls within a first range according to the first embodiment.

FIG. 5 is a graph that shows the relationship between the amount of adsorbed ammonia and the detected sensor value in the case where the amount of adsorbed ammonia at the time when the addition valve 4 is normal falls within the first range. Q11 is the amount of adsorbed ammonia at the time when the addition valve 4 is normal. Q12 is the amount of adsorbed ammonia at the time when the addition valve 4 is malfunction. Q11 is also regarded as the estimated amount of adsorption. Therefore, a detected sensor value S11 corresponding to Q11 may be also regarded as the estimated detected sensor value. Q12 may be also regarded as an actual amount of adsorbed ammonia.

The amount of adsorbed ammonia may be smaller when the addition valve 4 is malfunctioning compared to when the addition valve 4 is normal. In this case, as indicated by the dashed-line arrow in FIG. 5, the actual detected sensor value S12 corresponding to the amount of adsorbed ammonia Q12 in the case of the malfunction state may be larger than the estimated detected sensor value S11. The actual detected sensor value is hereinafter also referred to as actual detected sensor value. In the first range, when there occurs a malfunction in the addition valve 4, NOx flowing out from the NOx catalyst 3 due to a shortage of ammonia may be more remarkable than ammonia flowing out from the NOx catalyst 3. For this reason, in the first range, when there occurs a malfunction in the addition valve 4, the actual detected sensor value S12 becomes larger than the estimated detected sensor value S11 due to mainly an increase in NOx. Therefore, when the estimated amount of adsorption falls within the first range, a threshold for carrying out a malfunction diagnosis may be set to a value larger than the estimated detected sensor value, and, when the actual detected sensor value is larger than or equal to the threshold, it may be determined that the addition valve 4 is malfunctioning.

Figure 6:
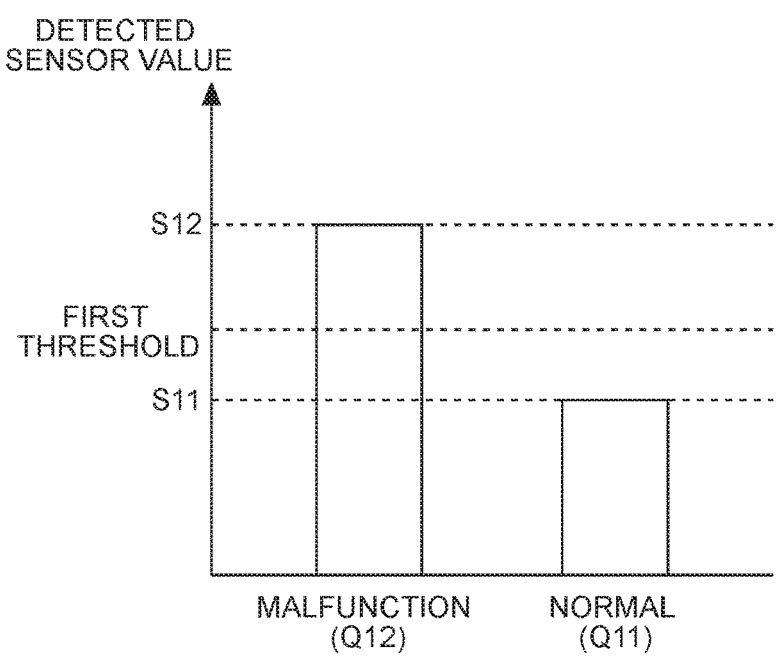
FIG. 6 is a graph that shows the relationship between detected sensor values at the time when the addition valve is normal and malfunctioning and a threshold for malfunction diagnosis of the addition valve in the case where the amount of adsorbed ammonia falls within the first range when the addition valve is normal according to the first embodiment.

FIG. 6 is a graph that shows the relationship between the detected sensor values at the time when the addition valve 4 is normal and malfunctioning and a threshold for carrying out a malfunction diagnosis of the addition valve 4 in the case where the amount of adsorbed ammonia falls within the first range when the addition valve 4 is normal. When the conditions other than the addition valve 4 are the same, the actual detected sensor value may be larger when the addition valve 4 is malfunctioning than when the addition valve 4 is normal. Therefore, when a value larger than that during normal times is set as a first threshold, it may be determined that the addition valve 4 is malfunctioning when the actual detected sensor value is larger than or equal to the first threshold. The first threshold may be a predetermined value or may be set in response to the estimated amount of adsorption. For example, an estimated detected sensor value may be obtained on the basis of the estimated amount of adsorption, a value larger by a set amount or a set percentage than the estimated detected sensor value may be set as the first threshold.

Figure 7:
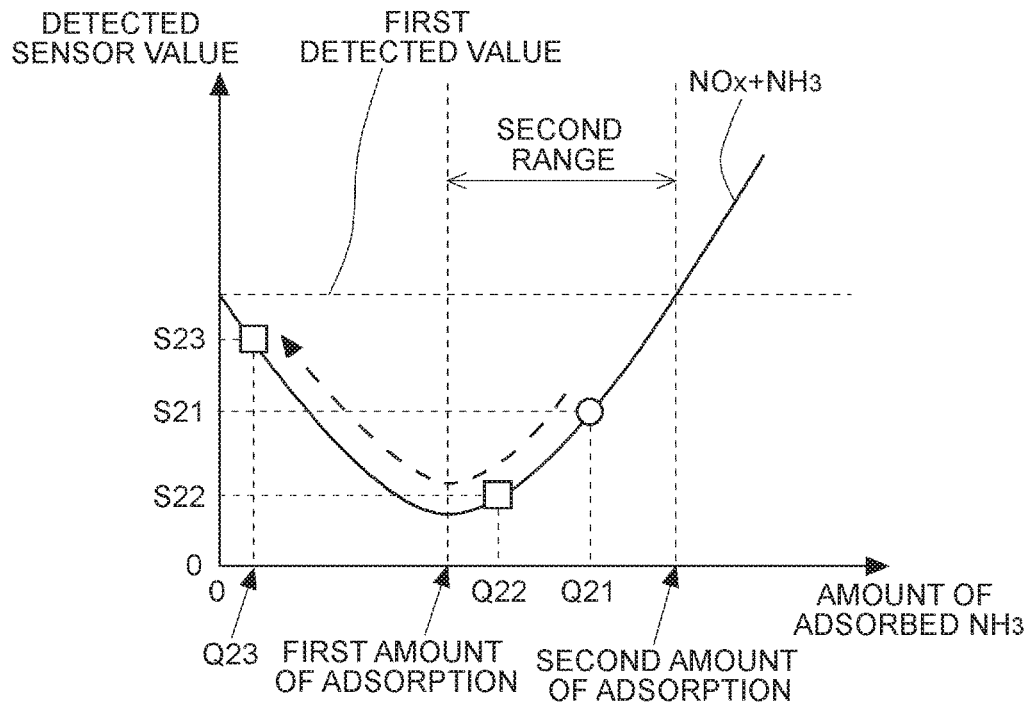
FIG. 7 is a graph that shows the relationship between the amount of adsorbed ammonia and a detected sensor value in the case where the amount of adsorbed ammonia at the time when the addition valve is normal falls within a second range according to the first embodiment.

Next, FIG. 7 is a graph that shows the relationship between the amount of adsorbed ammonia and the detected sensor value in the case where the amount of adsorbed ammonia at the time when the addition valve 4 is normal falls within the second range. Q21 is the amount of adsorbed ammonia at the time when the addition valve 4 is normal. Q22 and Q23 each are the amount of adsorbed ammonia at the time when the addition valve 4 is malfunction. Q21 may also be regarded as the estimated amount of adsorption. Therefore, a detected sensor value S21 corresponding to Q21 may be also regarded as the estimated detected sensor value. Q22 indicates the amount of adsorbed ammonia in the case where the amount of reduction in the amount of reducing agent supplied from the addition valve 4 due to a malfunction of the addition valve 4 is relatively small (in the case where the degree of malfunction is relatively low). Q23 indicates the amount of adsorbed ammonia in the case where the amount of reduction in the amount of reducing agent supplied from the addition valve 4 due to a malfunction of the addition valve 4 is relatively large (in the case where the degree of malfunction is relatively high).

As shown in FIG. 7, an actual detected sensor value S22 corresponding to the amount of adsorbed ammonia Q22 in the case where the amount of reduction in the amount of supplied reducing agent is relatively small is smaller than the estimated detected sensor value S21; however, an actual detected sensor value S23 corresponding to the amount of adsorbed ammonia Q23 in the case where the amount of reduction in the amount of supplied reducing agent is relatively large is larger than the estimated detected sensor value S21. When it is assumed that the amount of reducing agent supplied from the addition valve 4 gradually reduces in the case where the estimated amount of adsorption falls within the second range, initially, ammonia flowing out from the NOx catalyst 3 may reduce as a result of a reduction in the amount of ammonia adsorbed on the NOx catalyst 3. That is, when the amount of reduction in the amount of supplied reducing agent is relatively small, the actual detected sensor value may decrease due to mainly the influence of a reduction in the amount of ammonia flowing out from the NOx catalyst 3. On the other hand, as the amount of ammonia adsorbed on the NOx catalyst 3 may reduce with a reduction in the amount of reducing agent supplied from the addition valve 4, the influence of NOx that is not reduced in the NOx catalyst 3 and that flows out from the NOx catalyst 3 increases. That is, when the amount of reduction in the amount of supplied reducing agent is relatively large, the actual detected sensor value may increase due to mainly the influence of NOx flowing out from the NOx catalyst 3. In this way, in the case where the estimated amount of adsorption falls within the second range, as the amount of adsorbed ammonia reduces from the estimated amount of adsorption, the actual detected sensor value once decreases but increases thereafter. For this reason, in the second range, the actual detected sensor value in the case where there occurs a malfunction in the addition valve 4 may become larger than the estimated detected sensor value or become smaller than the estimated detected sensor value in response to the degree of malfunction.

Figure 8:
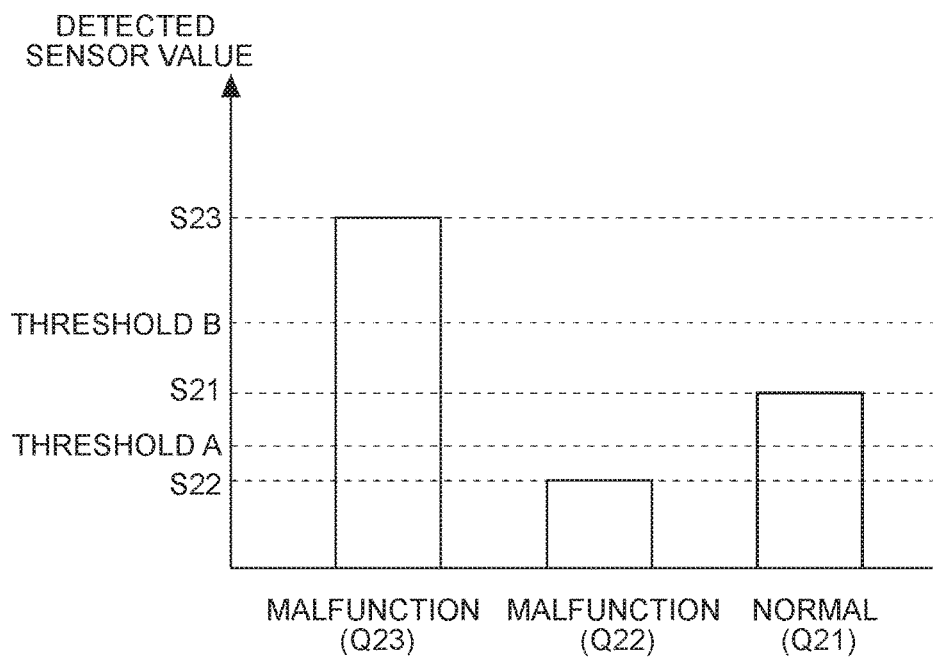
FIG. 8 is a graph that shows the relationship between detected sensor values at the time when the addition valve is normal and malfunctioning and a threshold for malfunction diagnosis of the addition valve in the case where the amount of adsorbed ammonia falls within the second range when the addition valve is normal according to the first embodiment.

FIG. 8 is a graph that shows the detected sensor values at the time when the addition valve 4 is normal and malfunctioning in the case where the amount of adsorbed ammonia falls within the second range when the addition valve 4 is normal. When the conditions other than the addition valve 4 are the same, the detected sensor value may be larger or may be smaller when the addition valve 4 is malfunctioning than when the addition valve 4 is normal. A threshold A smaller than the estimated detected sensor value S21 may be set and the addition valve 4 may be diagnosed as malfunctioning when the actual detected sensor value is smaller than or equal to the threshold A. In this case, when the actual detected sensor value is S22 in FIG. 8, the addition valve 4 may be diagnosed as malfunctioning; however, when the actual detected sensor value is S23 in FIG. 8, the addition valve 4 may be diagnosed as being normal although the addition valve 4 is actually malfunctioning. On the other hand, a threshold B larger than the estimated detected sensor value S21 may be set and the addition valve 4 may be diagnosed as malfunctioning when the actual detected sensor value is larger than or equal to the threshold B. In this case, when the actual detected sensor value is S23 in FIG. 8, the addition valve 4 may be diagnosed as malfunctioning; however, when the actual detected sensor value is S22 in FIG. 8, the addition valve 4 may be diagnosed as being normal although the addition valve 4 is actually malfunctioning. That is, even when a value larger than that during normal times or a value smaller than that during normal times is set as a threshold, it may be difficult to carry out a malfunction diagnosis of the addition valve 4. In this way, even when a threshold is set on the basis of the estimated detected sensor value, it may be difficult to carry out a diagnosis of whether there is a malfunction in the addition valve 4. For this reason, in the present embodiment, when the estimated amount of adsorption falls within the second range, a malfunction diagnosis of the addition valve 4 may be prohibited.

Figure 9:
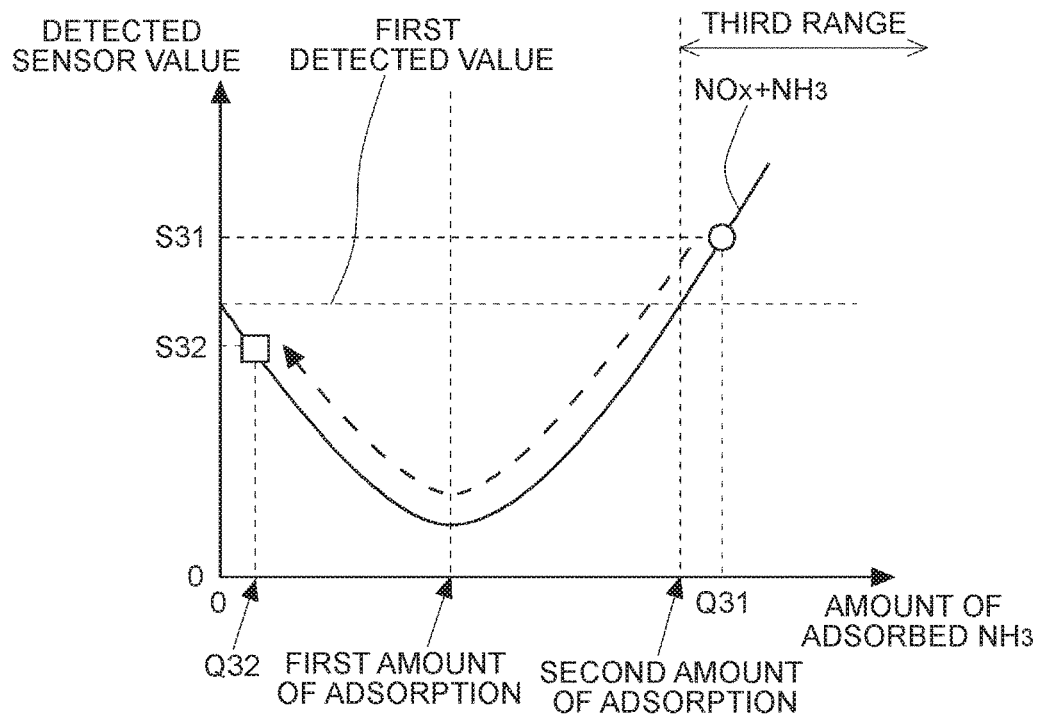
FIG. 9 is a graph that shows the relationship between the amount of adsorbed ammonia and a detected sensor value in the case where the amount of adsorbed ammonia at the time when the addition valve is normal falls within a third range according to the first embodiment.

FIG. 9 is a graph that shows the relationship between the amount of adsorbed ammonia and the detected sensor value in the case where the amount of adsorbed ammonia at the time when the addition valve 4 is normal falls within the third range. Q31 is the amount of adsorbed ammonia at the time when the addition valve 4 is normal. Q32 is the amount of adsorbed ammonia at the time when the addition valve 4 is malfunctioning. Q31 is also regarded as the estimated amount of adsorption. Therefore, a detected sensor value S31 corresponding to Q31 is also regarded as the estimated detected sensor value.

As shown in FIG. 9, an actual detected sensor value S32 corresponding to the amount of adsorbed ammonia Q32 in the case of the malfunction state may be smaller than the estimated detected sensor value S31. In the case where the estimated amount of adsorption falls within the third range, even when the actual amount of adsorbed ammonia reduces due to a malfunction of the addition valve 4, the actual detected sensor value may decrease up to the first amount of adsorption, so the actual detected sensor value is smaller than the estimated detected sensor value. In the case where the actual amount of adsorbed ammonia is smaller than the first amount of adsorption, the actual detected sensor value increases as the actual amount of adsorbed ammonia may reduce; however, even when the amount of adsorbed ammonia is zero, that is, when the actual detected sensor value is the largest, the actual detected sensor value may be smaller than the estimated detected sensor value S31. For this reason, the actual detected sensor value in the case where there occurs a malfunction in the addition valve 4 may be constantly smaller than the estimated detected sensor value. Therefore, when the estimated amount of adsorption falls within the third range, a threshold for carrying out a malfunction diagnosis may be set to a value smaller than the estimated detected sensor value, and, when the actual detected sensor value is smaller than or equal to the threshold, it may be determined that the addition valve 4 is malfunction.

Figure 10:
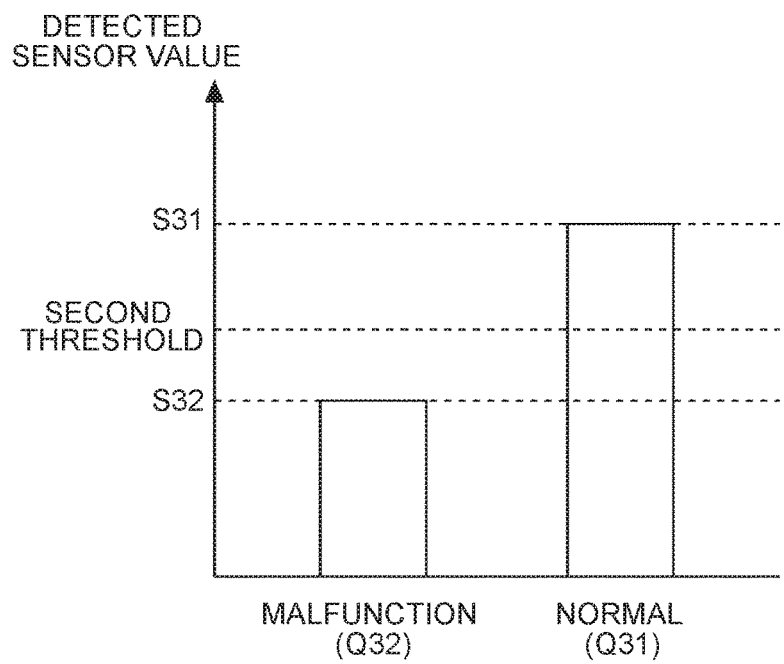
FIG. 10 is a graph that shows the relationship between detected sensor values at the time when the addition valve is normal and malfunctioning and a threshold for malfunction diagnosis of the addition valve in the case where the amount of adsorbed ammonia falls within the third range when the addition valve is normal according to the first embodiment.

FIG. 10 is a graph that shows the relationship between the detected sensor values at the time when the addition valve 4 is normal and malfunctioning and a threshold for carrying out a malfunction diagnosis of the addition valve 4 in the case where the amount of adsorbed ammonia falls within the third range when the addition valve 4 is normal. When the conditions other than the addition valve 4 are the same, the detected sensor value is smaller when the addition valve 4 is malfunctioning than that when the addition valve 4 is normal. Therefore, when a value smaller than that during normal times is set as a second threshold for carrying out a malfunction diagnosis, it may be determined that the addition valve 4 is malfunctioning in the case where the actual detected sensor value is smaller than or equal to the second threshold. If the second threshold is set to a value smaller than the first detected value, the actual detected sensor value can be larger than the second threshold when the actual amount of adsorbed ammonia is zero or close to zero. Therefore, there is a concern that the addition valve 4 is erroneously diagnosed as being normal although the addition valve 4 is actually malfunction. For this reason, the second threshold in the third range may be larger than the first detected value. The first detected value may be set as the second threshold. The second threshold may be a predetermined value or may be set in response to the estimated amount of adsorption. For example, an estimated detected sensor value may be obtained on the basis of the estimated amount of adsorption, and a value smaller by a set amount or a set percentage than the estimated detected sensor value may be set as the second threshold. When the thus set second threshold is smaller than or equal to the first detected value, a malfunction diagnosis of the addition valve 4 may be prohibited.

As described above, in the present embodiment, when the estimated amount of adsorption falls within the first range, a value larger than the estimated detected sensor value may be set as the first threshold. When the detected sensor value is larger than or equal to the first threshold, the addition valve 4 is diagnosed as being malfunction. When the detected sensor value is smaller than the first threshold, the addition valve 4 is diagnosed as being normal. When the estimated amount of adsorption falls within the second range, a malfunction diagnosis of the addition valve 4 may be prohibited. When the estimated amount of adsorption falls within the third range, a value smaller than the estimated detected sensor value is set as the second threshold. When the detected sensor value is smaller than or equal to the second threshold, the addition valve 4 may be diagnosed as malfunctioning. When the detected sensor value is larger than the second threshold, the addition valve 4 is diagnosed as being normal.

Figure 11:
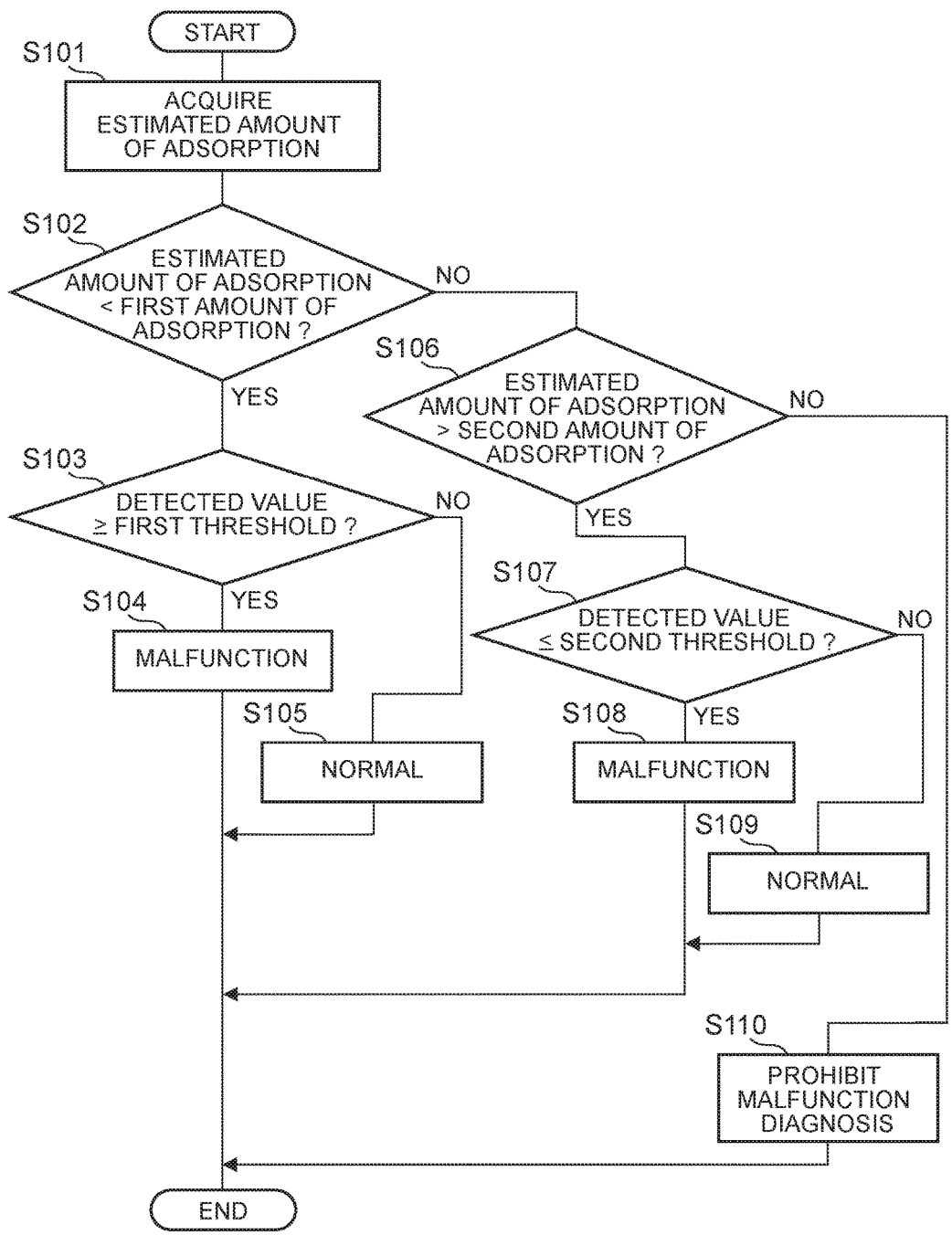
FIG. 11 is a flowchart that shows the process of carrying out a malfunction diagnosis of the addition valve according to a first embodiment.

FIG. 11 is a flowchart that shows the process of carrying out a malfunction diagnosis of the addition valve 4 according to the present embodiment. The flowchart may be executed by the ECU 10 at predetermined intervals.

In step S101, the estimated amount of adsorption is acquired. The estimated amount of adsorption may be calculated by the ECU 10 where necessary as described with reference to FIG. 2.

In step S102, it is determined whether the estimated amount of adsorption is smaller than the first amount of adsorption. The first amount of adsorption may be obtained in accordance with the relationship shown in FIG. 3. That is, the amount of adsorbed ammonia at the time when the detected sensor value is a local minimum value in FIG. 3 is the first amount of adsorption. The relationship shown in FIG. 3 may be obtained in advance by experiment, simulation, or the like, and stored in the ECU 10. In step S102, it is determined whether the estimated amount of adsorption falls within the first range. When affirmative determination is made in step S102, the process proceeds to step S103; whereas, when negative determination is made in step S102, the process proceeds to step S106.

In step S103, it may be determined whether the actual detected sensor value is larger than or equal to the first threshold. The first threshold is a threshold of the detected sensor value, which may be set in the case where the estimated amount of adsorption falls within the first range, and is the detected sensor value at the time when the addition valve 4 is at the boundary between the normal state and the malfunction state. The first threshold may be a value larger than the estimated detected sensor value as shown in FIG. 6. The first threshold may be a predetermined value or may be set in response to the estimated amount of adsorption. For example, an estimated detected sensor value corresponding to the estimated amount of adsorption may be obtained, and a value larger by a set amount or a set percentage than the estimated detected sensor value may be set as the first threshold.

When affirmative determination is made in step S103, the process proceeds to step S104, and the addition valve 4 is diagnosed as being malfunction. On the other hand, when negative determination is made in step S103, the process proceeds to step S105, and the addition valve 4 may be diagnosed as being normal.

On the other hand, in step S106, it may be determined whether the estimated amount of adsorption is larger than the second amount of adsorption. The second amount of adsorption may be obtained in accordance with the relationship shown in FIG. 3. That is, the amount of adsorbed ammonia larger than the first amount of adsorption at the time when the detected sensor value is the same value as the first detected value is the second amount of adsorption. In step S106, it is determined whether the estimated amount of adsorption falls within the third range.

In step S106, it may be determined whether the estimated amount of adsorption falls within the third range by comparing the amount of adsorbed ammonia. Instead, it may be determined whether the estimated amount of adsorption falls within the third range on the basis of the detected sensor value. That is, as shown in FIG. 3, there may be a correlation between the amount of adsorbed ammonia and the detected sensor value, so it is possible to calculate the estimated detected sensor value in response to the estimated amount of adsorption. When the thus calculated estimated detected sensor value is larger than the first detected value, it may be determined that the estimated amount of adsorption falls within the third range. When affirmative determination is made in step S106, the process may proceed to step S107; whereas, when negative determination is made in step S106, the process proceeds to step S110.

In step S107, it may be determined whether the actual detected sensor value is smaller than or equal to the second threshold. The second threshold is a threshold of the detected sensor value in the case where the estimated amount of adsorption falls within the third range, and is the detected sensor value at the time when the addition valve 4 is at the boundary between the normal state and the malfunction state. The second threshold may be a value smaller than the estimated detected sensor value as shown in FIG. 10. The second threshold may be set as a predetermined value or may be set in response to the estimated amount of adsorption. For example, an estimated detected sensor value corresponding to the estimated amount of adsorption may be obtained, and a value smaller by a set amount or a set percentage than the estimated detected sensor value may be set as the first threshold. The first detected value may be set as the second threshold.

When affirmative determination is made in step S107, the process proceeds to step S108; and the addition valve 4 may be diagnosed as being malfunction. On the other hand, when negative determination is made in step S107, the process proceeds to step S109, and the addition valve 4 is diagnosed as being normal.

When the estimated amount of adsorption is larger than or equal to the first amount of adsorption and smaller than or equal to the second amount of adsorption, the estimated amount of adsorption falls within the second range, so the ECU 10 may prohibit a malfunction diagnosis of the addition valve 4 in step S110.

As described above, according to the present embodiment, when the estimated amount of adsorption falls within the second range, a malfunction diagnosis of the addition valve 4 may be prohibited, so it is possible to prevent or reduce a decrease in the accuracy of malfunction diagnosis. When the estimated amount of adsorption falls within the second range, a malfunction diagnosis of the addition valve 4 may be carried out with the use of another known technique.

Next, the second embodiment will be described. In the second embodiment, first to fourth techniques for simply determining within which one of the first range, the second range and the third range the amount of adsorbed ammonia falls without the use of the relationship shown in FIG. 3 will be described. The following techniques may be combined with each other. The detected sensor value may be the sum of the concentration of NOx and the concentration of ammonia, so the detected sensor value can change due to factors that influence the concentration of NOx or the concentration of ammonia. The amount of adsorbed ammonia that is the boundary between the first range and the second range and that is obtained with the use of the following methods is referred to as the first amount of adsorption, and the amount of adsorbed ammonia that is the boundary between the second range and the third range is referred to as the second amount of adsorption. That is, the detected sensor value may become a minimum value at the boundary between the first range and the second range, and the detected sensor value at the boundary between the second range and the third range is equal to the first detected value.

Figure 12:
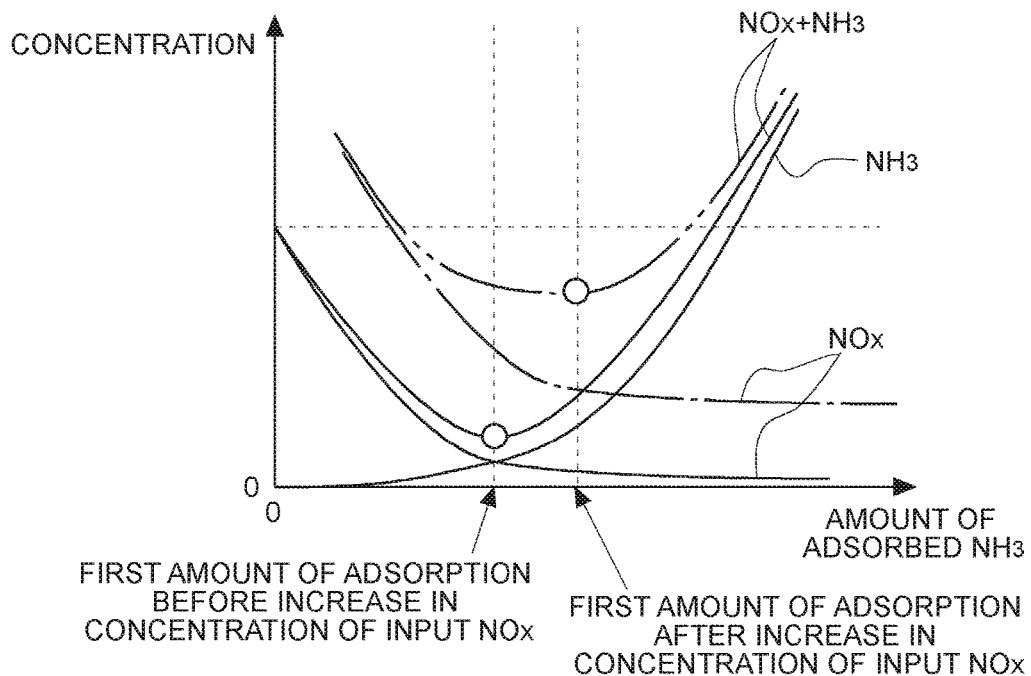
FIG. 12 is a graph in the case where the concentration of input NOx is increased with respect to the relationship shown in FIG. 3.

The first technique will be described below. FIG. 12 is a graph in the case where the concentration of input NOx is increased as compared to the relationship shown in FIG. 3. The continuous lines indicate the case shown in FIG. 3. The alternate long and short dashes line indicates the concentration of NOx after the concentration of input NOx is increased. The alternate long and two-short dashes line indicates the sum of the concentration of NOx and the concentration of ammonia, that is, the detected sensor value, after the concentration of input NOx is increased. As the concentration of NOx in exhaust gas flowing into the NOx catalyst 3 (the concentration of input NOx) increases, the concentration of NOx in exhaust gas flowing out from the NOx catalyst 3 (the concentration of output NOx) also may increase. When the concentration of output $NH_3$ does not change, the detected sensor value may increase by the amount of increase in the concentration of output NOx. In this case, as the concentration of output NOx increases, the local minimum value of the detected sensor value increases, and the first amount of adsorption increases. For this reason, as the concentration of input NOx increases, the first range may expand, so the estimated amount of adsorption falls within the first range. Similarly, as the concentration of input NOx decreases, the third range may expand, so the estimated amount of adsorption falls within the third range. The first technique is a technique for setting the range within which the estimated amount of adsorption falls by obtaining the range, within which the estimated amount of adsorption is likely to fall, on the basis of the concentration of input NOx. When the concentration of input NOx is high, it may be determined that the estimated amount of adsorption falls within the first range. When the concentration of input NOx is low, it may be determined that the estimated amount of adsorption falls within the third range. When the concentration of input NOx is intermediate, it may be determined that the estimated amount of adsorption falls within the second range. The relationship between the concentration of input NOx and each of the first range, the second range and the third range may be obtained in advance by experiment, simulation, or the like. The concentration of input NOx may be detected by the upstream NOx sensor 11.

Figure 13:
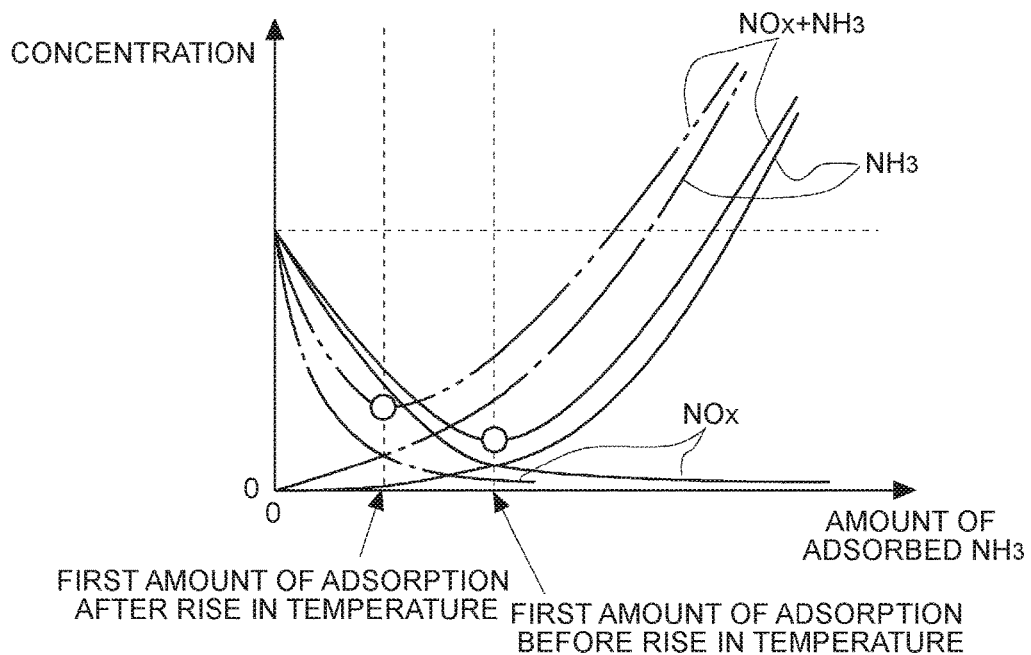
FIG. 13 is a graph in the case where the temperature of the NOx catalyst is raised as compared to the relationship shown in FIG. 3.

Next, the second technique will be described. As the temperature of the NOx catalyst 3 rises, the amount of ammonia adsorbable by the NOx catalyst 3 may reduce, so the amount of ammonia flowing out from the NOx catalyst 3 increases. Therefore, as the temperature of the NOx catalyst 3 rises, ammonia that is detected by the downstream NOx sensor 12 may increase. On the other hand, as the temperature of the NOx catalyst 3 rises, the NOx purification rate in the NOx catalyst 3 may increase. Therefore, when the estimated amount of adsorption is the same, the concentration of output NOx may decrease. Therefore, as the temperature of the NOx catalyst 3 rises, NOx that is detected by the downstream NOx sensor 12 may reduce. FIG. 13 is a graph in the case where the temperature of the NOx catalyst 3 is raised as compared to the relationship shown in FIG. 3. The continuous lines indicate the case shown in FIG. 3. The alternate long and short dashes line indicates the concentration of NOx or the concentration of NOx after the temperature is raised. The alternate long and two-short dashes line indicates the sum of the concentration of NOx and the concentration of ammonia, that is, the detected sensor value, after the temperature is raised. As the temperature of the NOx catalyst 3 rises, the first amount of adsorption reduces. For this reason, as the temperature rises, the estimated amount of adsorption falls within the third range. That is, as the temperature of the NOx catalyst 3 rises, the influence of ammonia flowing out from the NOx catalyst 3 increases, so the estimated amount of adsorption falls within the third range. The second technique is a technique for simply setting the range within which the estimated amount of adsorption falls by obtaining the range, within which the estimated amount of adsorption is likely to fall, on the basis of the temperature of the NOx catalyst 3. When the temperature is high, it may be determined that the estimated amount of adsorption falls within the third range. When the temperature is low, it may be determined that the estimated amount of adsorption falls within the first range. When the temperature is intermediate, it may be determined that the estimated amount of adsorption falls within the second range. The relationship between the concentration of input NOx and each of the first range, the second range and the third range may be obtained in advance by experiment, simulation, or the like.

The third technique will be described. In the relationship shown in FIG. 3, each of the first range, the second range and the third range may be determined on the basis of the estimated amount of adsorption and the detected sensor value. Instead, each of the ranges may be obtained on the basis of only the estimated amount of adsorption. As the estimated amount of adsorption increases, the concentration of ammonia in exhaust gas flowing out from the NOx catalyst 3 may increase, and the concentration of NOx in exhaust gas flowing out from the NOx catalyst 3 may decrease. Therefore, as the estimated amount of adsorption increases, the influence of ammonia flowing out from the NOx catalyst 3 may increase so the estimated amount of adsorption easily falls within the third range. The third technique is a technique for simply setting the range within which the estimated amount of adsorption falls on the basis of the range within which the estimated amount of adsorption is highly likely to fall. When the estimated amount of adsorption is large, it may be determined that the estimated amount of adsorption falls within the third range. When the estimated amount of adsorption is small, it may be determined that the estimated amount of adsorption falls within the first range. When the estimated amount of adsorption is intermediate, it may be determined that the estimated amount of adsorption falls within the second range. The relationship between the estimated amount of adsorption and each of the first range, the second range and the third range may be obtained in advance by experiment, simulation, or the like.

The fourth technique will be described. As the amount of reducing agent supplied from the addition valve 4 increases, the amount of ammonia adsorbed on the NOx catalyst 3 may increase, so the concentration of ammonia in exhaust gas flowing out from the NOx catalyst 3 increases, and the concentration of NOx in exhaust gas flowing out from the NOx catalyst 3 decreases. Therefore, as the amount of supplied reducing agent increases, the influence of ammonia flowing out from the NOx catalyst 3 increases, so the estimated amount of adsorption falls within the third range. The fourth technique is a technique for setting the range within which the estimated amount of adsorption falls by obtaining the range, within which the estimated amount of adsorption is likely to fall, on the basis of the amount of supplied reducing agent. When the amount of supplied reducing agent is large, it may be determined that the estimated amount of adsorption falls within the third range. When the amount of supplied reducing agent is small, it may be determined that the estimated amount of adsorption falls within the first range. When the amount of supplied reducing agent is intermediate, it may be determined that the estimated amount of adsorption falls within the second range. The relationship between the amount of supplied reducing agent and each of the first range, the second range and the third range may be obtained in advance by experiment, simulation, or the like.

In the fourth technique, determination may be made on the basis of the ratio of the actual amount of supplied reducing agent to the reference amount of supplied reducing agent instead of the amount of supplied reducing agent. The reference amount of supplied reducing agent may be the amount of supplied reducing agent, which is determined in response to the amount of input NOx. The amount of adsorbed ammonia may temporarily reduce depending on the operating state of the internal combustion engine 1. In such a case, in order to quickly increase the amount of adsorbed ammonia, reducing agent in an amount larger than the reference amount of supplied reducing agent can be supplied. On the other hand, depending on the operating state of the internal combustion engine 1, reducing agent in an amount smaller than the reference amount of supplied reducing agent can be supplied in order to reduce ammonia flowing out from the NOx catalyst 3. When the amount of supplied reducing agent is larger than the reference amount of supplied reducing agent, ammonia may flow out from the NOx catalyst 3, and the NOx purification rate increases. On the other hand, when the amount of supplied reducing agent is smaller than the reference amount of supplied reducing agent, ammonia is may not as easily flow out from the NOx catalyst 3, and the NOx purification rate may decrease. Therefore, when the ratio of the amount of supplied reducing agent to the reference amount of supplied reducing agent is large, it is determined that the estimated amount of adsorption falls within the third range. When the ratio is small, it is determined that the estimated amount of adsorption falls within the first range. When the ratio is intermediate, it is determined that the estimated amount of adsorption falls within the second range. The relationship between the ratio of the amount of supplied reducing agent to the reference amount of supplied reducing agent and each of the first range, the second range and the third range may be obtained in advance by experiment, simulation, or the like.

As described above, according to the present embodiment, it is possible to obtain which range within which the estimated amount of adsorption falls.

Next, the third embodiment will be described below. In the present embodiment, when the estimated amount of adsorption falls within the second range, control for causing the estimated amount of adsorption to fall outside the second range may be executed. In the present embodiment, when the estimated amount of adsorption falls within the third range and the second threshold is smaller than or equal to the first detected value, control for causing the second threshold to become larger than the first detected value may be executed. These controls are hereinafter referred to as active control.

The estimated amount of adsorption is caused to fall outside the second range by increasing the amount of supplied reducing agent, reducing the amount of supplied reducing agent, increasing the concentration of NOx in exhaust gas flowing into the NOx catalyst 3 (which may also be the concentration of NOx in exhaust gas flowing out from the NOx catalyst 3) or reducing the concentration of NOx in exhaust gas flowing into the NOx catalyst 3 (which may be the concentration of NOx in exhaust gas flowing out from the NOx catalyst 3).

Figure 14:
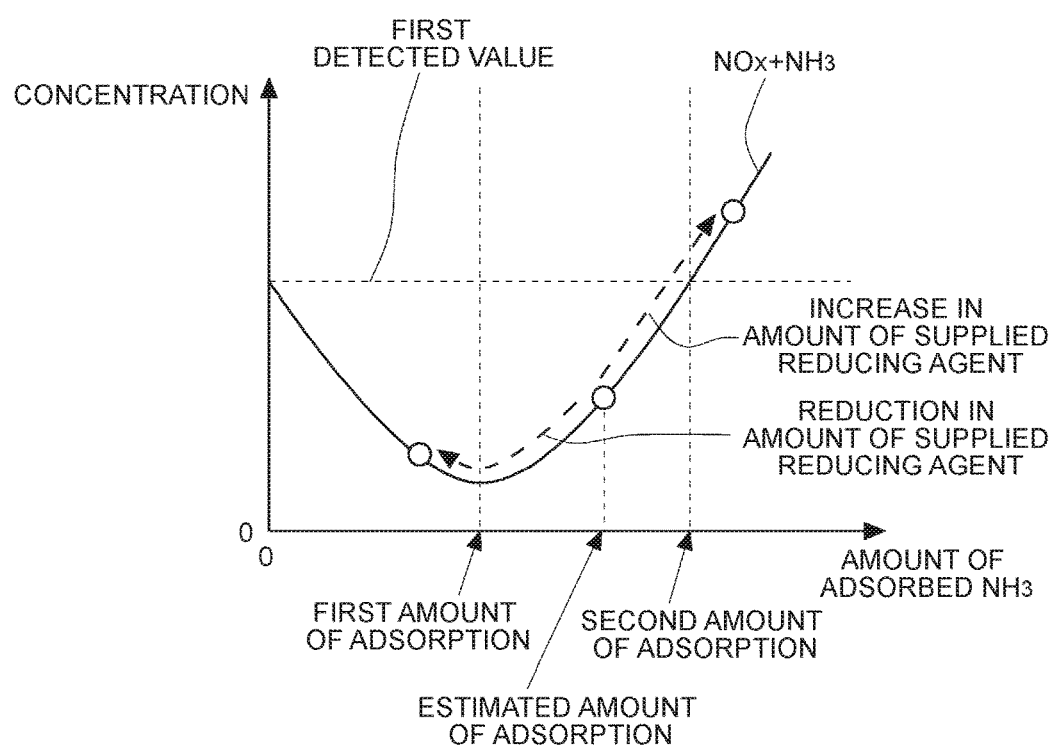
FIG. 14 is a graph that shows the relationship between the amount of adsorbed ammonia and the sum of the concentrations of NOx and ammonia flowing out from the NOx catalyst (that is, a detected sensor value) in the case where the amount of supplied reducing agent is increased or reduced such that the estimated amount of adsorption falls outside the second range.

FIG. 14 is a graph that shows the relationship between the amount of adsorbed ammonia and the sum of the concentrations of NOx and ammonia flowing out from the NOx catalyst 3 (that is, the detected sensor value) in the case where the amount of supplied reducing agent is increased or reduced such that the estimated amount of adsorption falls outside the second range. The estimated amount of adsorption increases or reduces with an increase or reduction in the amount of supplied reducing agent, so the estimated detected sensor value also changes. That is, an increase in the amount of supplied reducing agent increases the amount of $NH_3$ supplied in FIG. 2, so the estimated amount of adsorption moves toward an increasing side. Therefore, the amount of supplied reducing agent may be increased until the estimated amount of adsorption falls within the third range. On the other hand, a reduction in the amount of supplied reducing agent may cause the estimated amount of adsorption to move toward a reducing side. Therefore, the amount of supplied reducing agent may be reduced until the estimated amount of adsorption falls within the first range.

Figure 15:
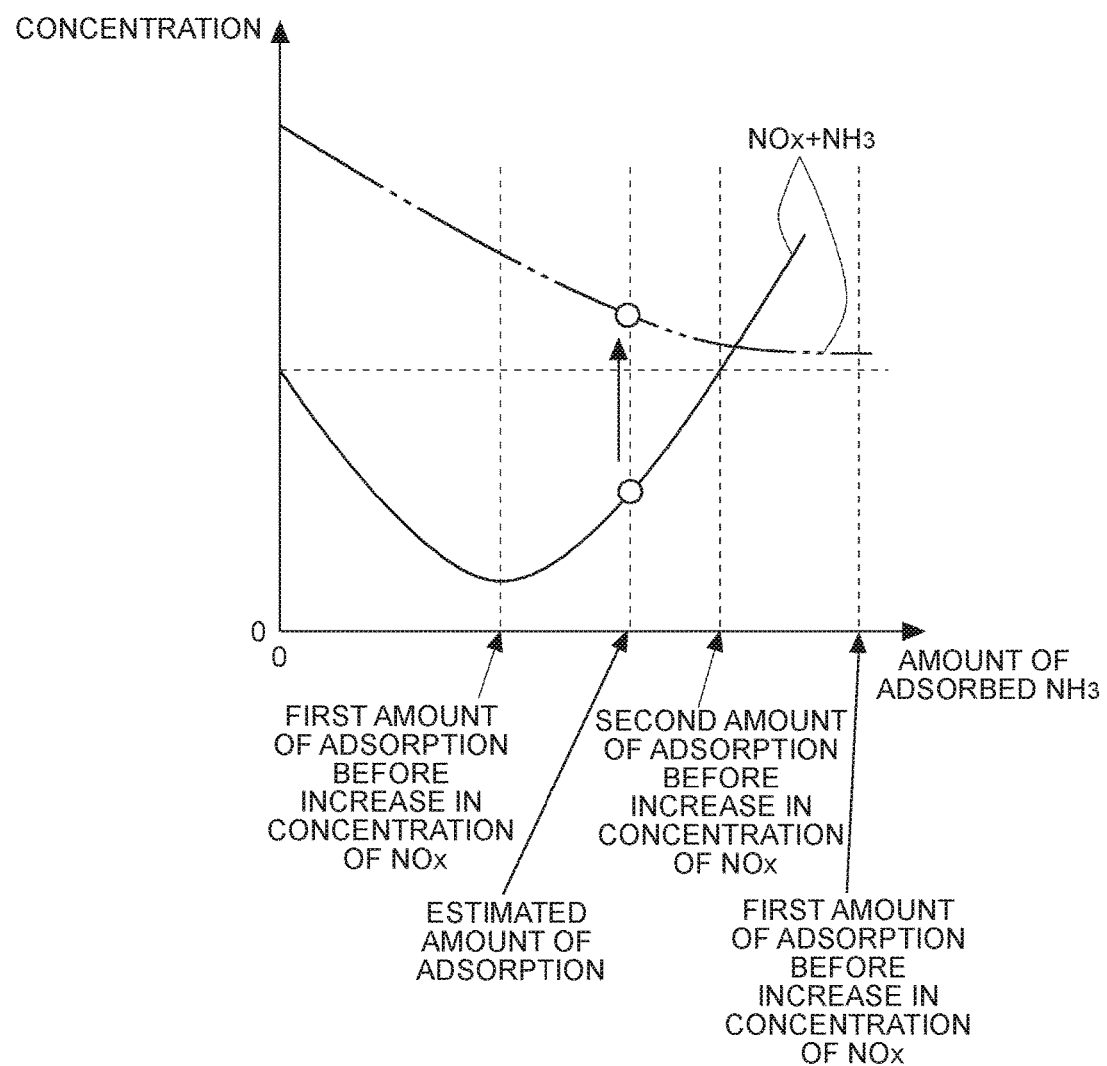
FIG. 15 is a graph that shows the relationship between the amount of adsorbed ammonia and the sum of the concentrations of NOx and ammonia flowing out from the NOx catalyst in the case where the concentration of NOx in exhaust gas flowing into the NOx catalyst is increased such that the estimated amount of adsorption falls outside the second range.

FIG. 15 is a graph that shows the relationship between the amount of adsorbed ammonia and the sum of the concentrations of NOx and ammonia flowing out from the NOx catalyst 3 in the case where the concentration of NOx in exhaust gas flowing into the NOx catalyst 3 (which may also be the concentration of NOx in exhaust gas flowing out from the NOx catalyst 3) is increased such that the estimated amount of adsorption falls outside the second range. The continuous line indicates a state before the concentration of NOx is increased. The alternate long and two-short dashes line indicates a state after the concentration of NOx is increased. As described with reference to FIG. 12, as the concentration of NOx in exhaust gas flowing into the NOx catalyst 3 increases, the concentration of NOx in exhaust gas flowing out from the NOx catalyst 3 may also increase, so the detected sensor value may also increase. Thus, the first amount of adsorption may move toward an increasing side. In this case, the positional relationship between the estimated amount of adsorption and the first amount of adsorption may be allowed to be changed, so the estimated amount of adsorption falls within the first range. Therefore, the concentration of NOx in exhaust gas flowing into the NOx catalyst 3 may be increased until the estimated amount of adsorption falls within the first range. An increase in the concentration of NOx may be enabled by, for example, reducing the amount of EGR gas. The opening degree of the EGR valve 32 may be obtained in advance by experiment, simulation, or the like, and stored in the ECU 10.

Figure 16:
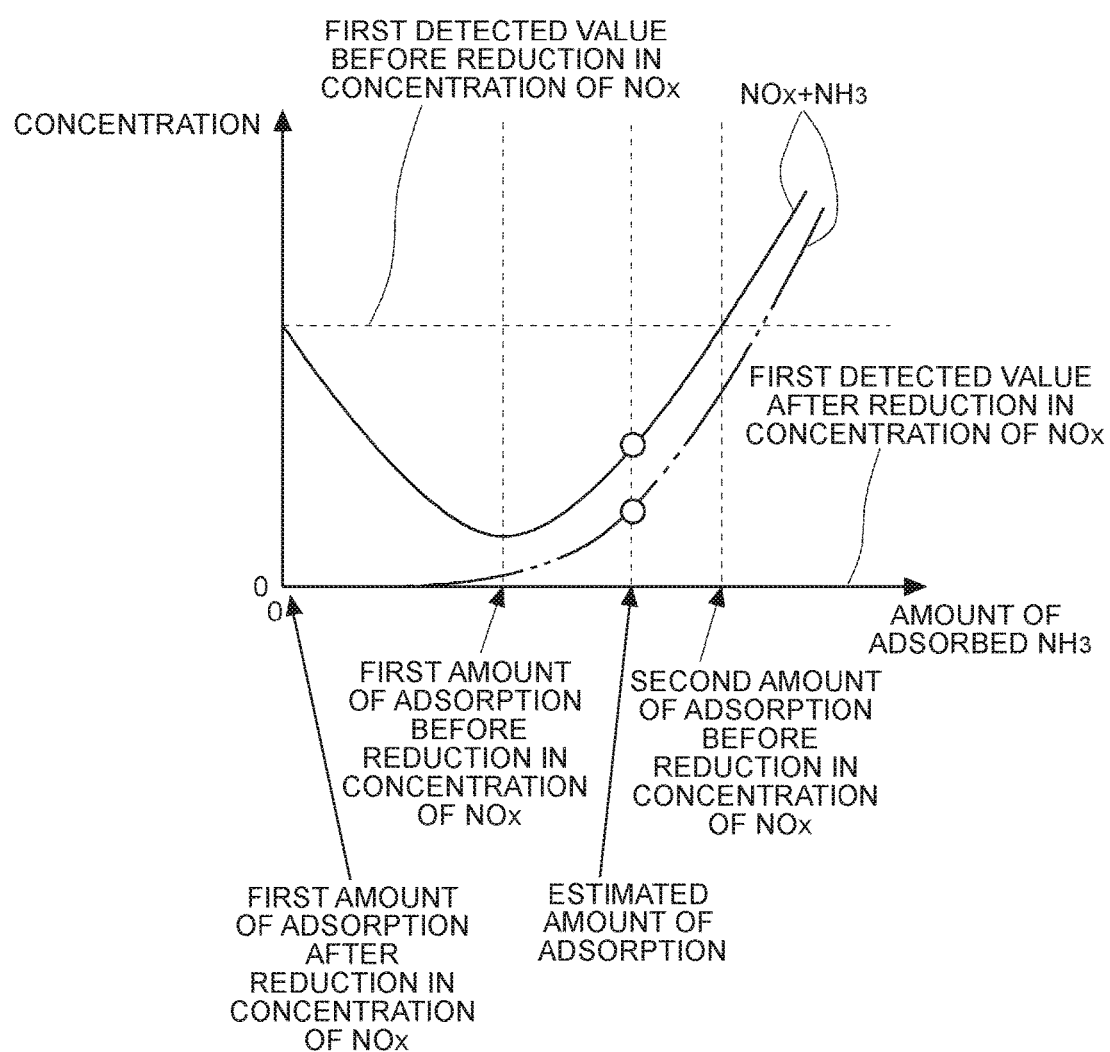
FIG. 16 is a graph that shows the relationship between the amount of adsorbed ammonia and the sum of the concentrations of NOx and ammonia flowing out from the NOx catalyst in the case where the concentration of NOx in exhaust gas flowing into the NOx catalyst is reduced such that the estimated amount of adsorption falls outside the second range.

FIG. 16 is a graph that shows the relationship between the amount of adsorbed ammonia and the sum of the concentrations of NOx and ammonia flowing out from the NOx catalyst 3 in the case where the concentration of NOx in exhaust gas flowing into the NOx catalyst 3 (which may also be the concentration of NOx in exhaust gas flowing out from the NOx catalyst 3) is reduced such that the estimated amount of adsorption falls outside the second range. The continuous line indicates a state before the concentration of NOx is reduced. The alternate long and two-short dashes line indicates a state after the concentration of NOx is reduced. The alternate long and two-short dashes line in FIG. 16 indicates the case where the concentration of NOx is substantially zero. That is, the detected sensor value indicates the concentration of ammonia. As the concentration of NOx in exhaust gas flowing into the NOx catalyst 3 reduces, the concentration of NOx in exhaust gas flowing out from the NOx catalyst 3 also reduces, so the detected sensor value also reduces. Before the concentration of NOx is reduced, NOx flowing out from the NOx catalyst 3 is remarkable within the range in which the amount of adsorbed ammonia is relatively small. Therefore, a decrease in the detected sensor value may be remarkable due to a reduction in the concentration of NOx within the range in which the amount of adsorbed ammonia is relatively small. Thus, the second amount of adsorption may move toward a reducing side. In this case, it is possible to change the positional relationship between the estimated amount of adsorption and the second amount of adsorption, so the estimated amount of adsorption falls within the third range. Therefore, the concentration of NOx in exhaust gas flowing into the NOx catalyst 3 may be reduced until the estimated amount of adsorption falls within the third range. A reduction in the concentration of NOx may be enabled by, for example, increasing the amount of EGR gas. The opening degree of the EGR valve 32 may be obtained in advance by experiment, simulation, or the like, and stored in the ECU 10.

Figure 17:
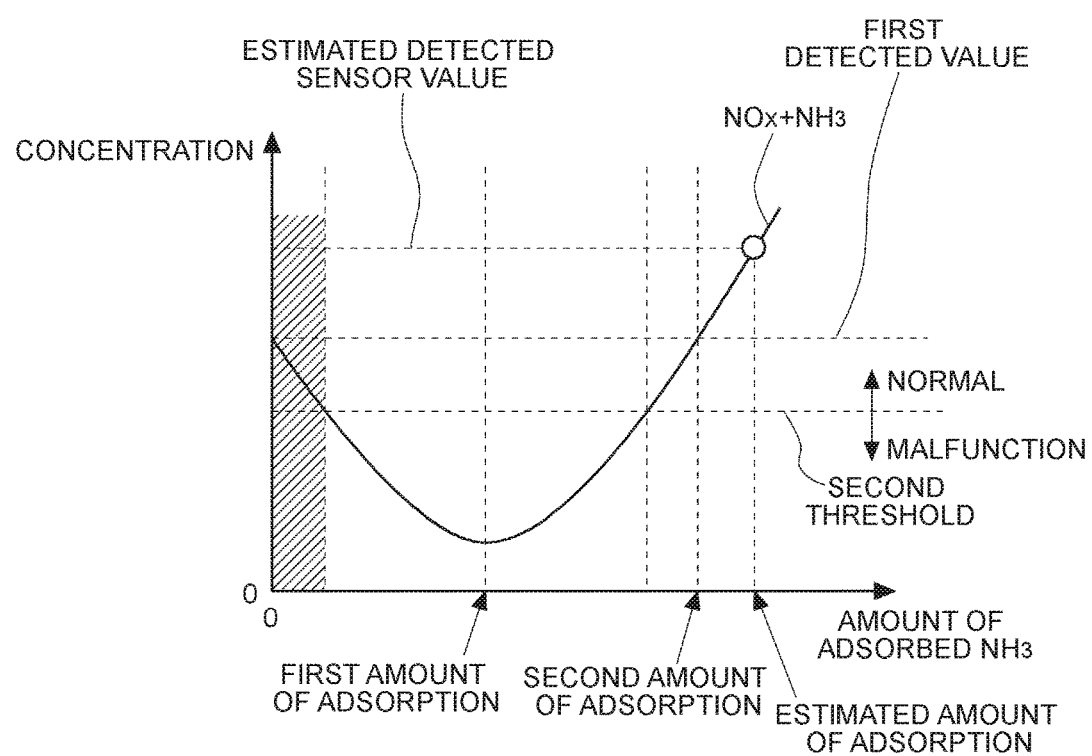
FIG. 17 is a graph that shows the relationship between the amount of adsorbed ammonia and the sum of the concentrations of NOx and ammonia flowing out from the NOx catalyst in the case where a second threshold is set so as to be smaller than a first detected value when the estimated amount of adsorption falls within the third range.

In the present embodiment, when the estimated amount of adsorption falls within the third range, a value smaller by a set amount or a set percentage than the estimated detected sensor value may be set as the second threshold. However, when the estimated amount of adsorption falls within the third range, if a value smaller by a set amount or a set percentage than the estimated detected sensor value is set as the second threshold, the second threshold can be smaller than or equal to the first detected value. FIG. 17 is a graph that shows the relationship between the amount of adsorbed ammonia and the sum of the concentrations of NOx and ammonia flowing out from the NOx catalyst 3 in the case where the second threshold is set so as to be smaller than the first detected value when the estimated amount of adsorption falls within the third range. When the actual detected sensor value is smaller than or equal to the second threshold, the addition valve 4 may be diagnosed as malfunctioning. When the actual detected sensor value is larger than the second threshold, the addition valve 4 may be diagnosed as being normal. In this case, when the actual detected sensor value is larger than the second threshold and smaller than or equal to the first detected value, the addition valve 4 may be erroneously diagnosed as being normal although the addition valve 4 is actually malfunctioning. That is, there is a concern about erroneous diagnosis within the hatched range in FIG. 17. In contrast, in the present embodiment, when the estimated amount of adsorption falls within the third range and the second threshold is smaller than or equal to the first detected value, active control is executed such that the second threshold becomes larger than the first detected value. That is, in the case where the estimated amount of adsorption falls within the third range, when the second threshold for carrying out a malfunction diagnosis of the addition valve 4 is smaller than or equal to the first detected value, the concentration of NOx in exhaust gas flowing into the NOx catalyst 3 (which may be the concentration of NOx in exhaust gas flowing out from the NOx catalyst 3) may be reduced such that the second threshold becomes larger than the first detected value. In this case, the second amount of adsorption may be regarded as being changed such that the second threshold becomes larger than the first detected value.

Figure 18:
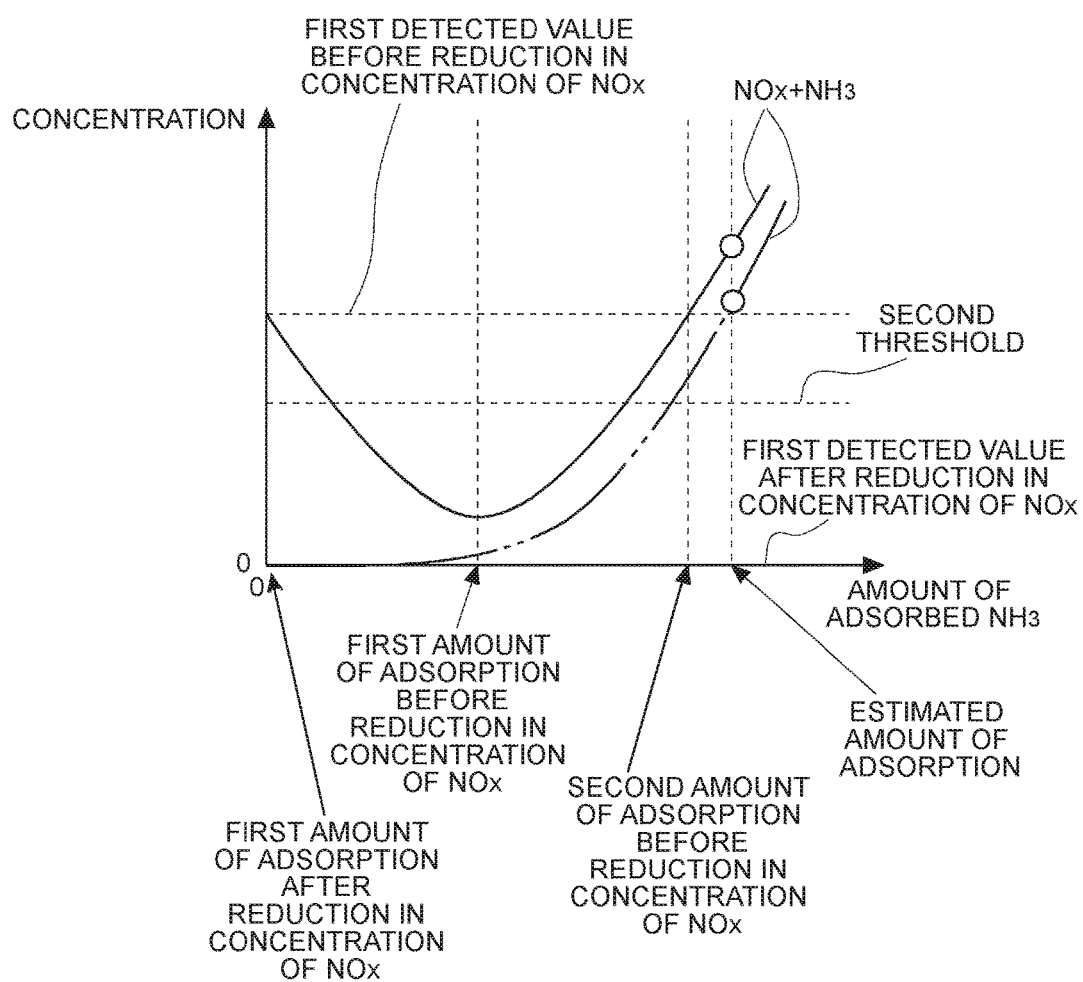
FIG. 18 is a graph that shows the relationship between the amount of adsorbed ammonia and the sum of the concentrations of NOx and ammonia flowing out from the NOx catalyst in the case where the concentration of NOx in exhaust gas flowing into the NOx catalyst is reduced such that a threshold becomes larger than the first detected value when the estimated amount of adsorption falls within the third range.

FIG. 18 is a graph that shows the relationship between the amount of adsorbed ammonia and the sum of the concentrations of NOx and ammonia flowing out from the NOx catalyst 3 in the case where the concentration of NOx in exhaust gas flowing into the NOx catalyst 3 (which may be the concentration of NOx in exhaust gas flowing out from the NOx catalyst 3) is reduced such that the threshold becomes larger than the first detected value in the case where the estimated amount of adsorption falls within the third range. The continuous line indicates a state before the concentration of NOx is reduced. The alternate long and two-short dashes line indicates a state after the concentration of NOx is reduced. The alternate long and two-short dashes line indicates the case where the concentration of NOx is substantially zero. The first detected value indicates the concentration of NOx in a state where no ammonia is adsorbed on the NOx catalyst 3. Therefore, as the concentration of NOx in exhaust gas flowing into the NOx catalyst 3 reduces, the first detected value also reduces. In this case, the second threshold becomes larger than the first detected value as a result of movement of the first detected value. Therefore, the concentration of NOx in exhaust gas flowing into the NOx catalyst 3 should be reduced until the second threshold becomes larger than the first detected value.

Figure 19:
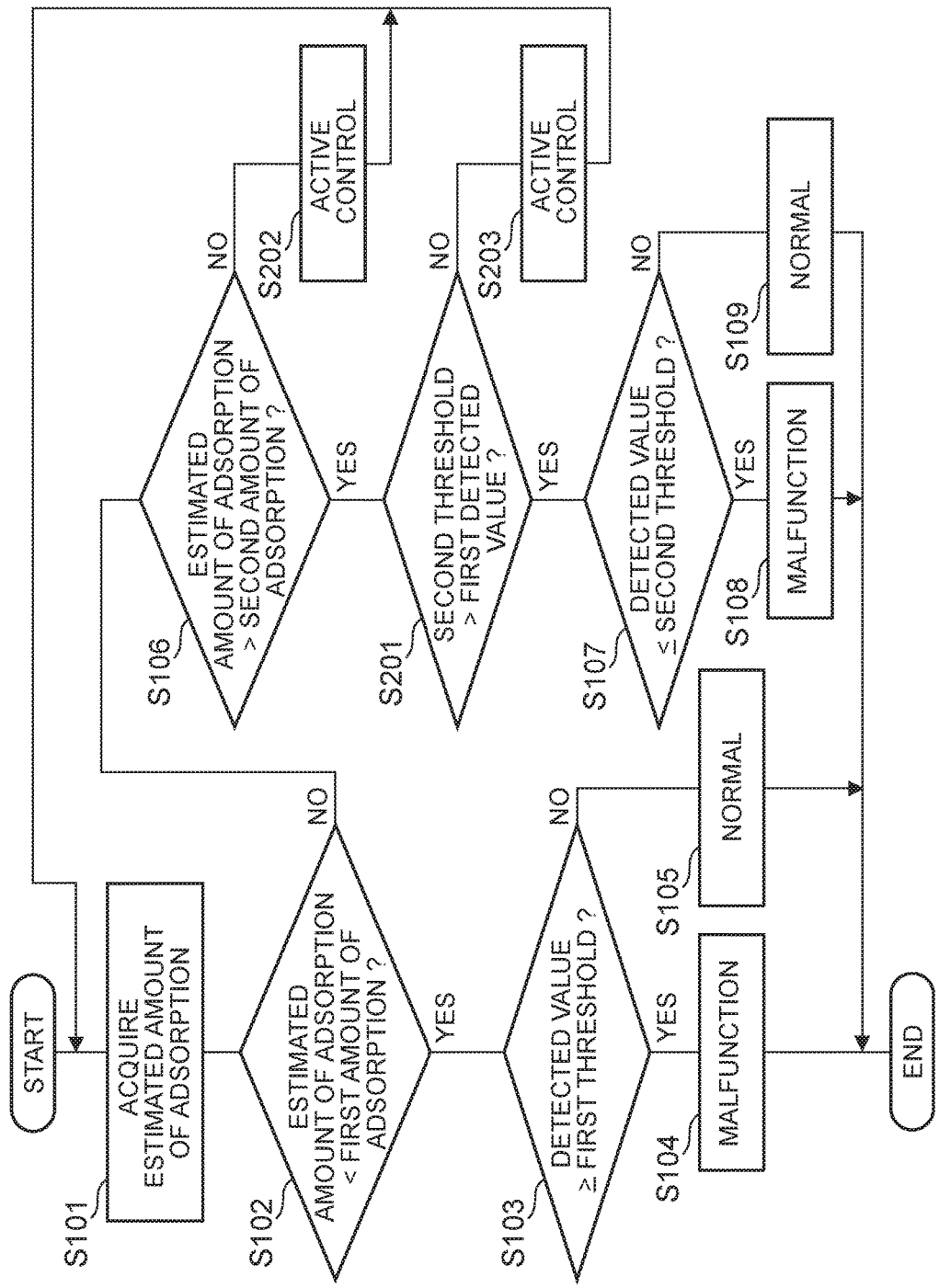
FIG. 19 is a flowchart that shows the process of active control according to a third embodiment.

FIG. 19 is a flowchart that shows the process of active control according to the present embodiment. The flowchart may be executed by the ECU 10 instead of the flowchart shown in FIG. 11. Like step numbers denote steps in which the same processes as those of the above-described flowchart are executed, and the description thereof is omitted.

In the flowchart shown in FIG. 19, when affirmative determination is made in step S106, the process proceeds to step S201. In step S201, it is determined whether the second threshold is larger than the first detected value. In this step, it is determined whether the second threshold is a value at which a malfunction diagnosis is allowed to be accurately carried out within the third range. That is, if the second threshold is smaller than or equal to the first detected value, the actual detected sensor value may be larger than the second threshold even when there is a malfunction in the addition valve 4. For this reason, when the second threshold is smaller than or equal to the first detected value, a malfunction diagnosis may be carried out after active control is executed. The second threshold is obtained as in the case of step S107. When affirmative determination is made in step S201, the process proceeds to step S107.

When negative determination is made in step S106, the process proceeds to step S202. In step S202, active control is executed. The flowchart of active control regarding step S202 will be described later. When the process of step S202 completes, the process proceeds to step S101. When negative determination is made in step S201, the process proceeds to step S203, and active control is executed. The flowchart of active control according to step S203 will be described later. When the process of step S203 completes, the process proceeds to step S101.

Figure 20:
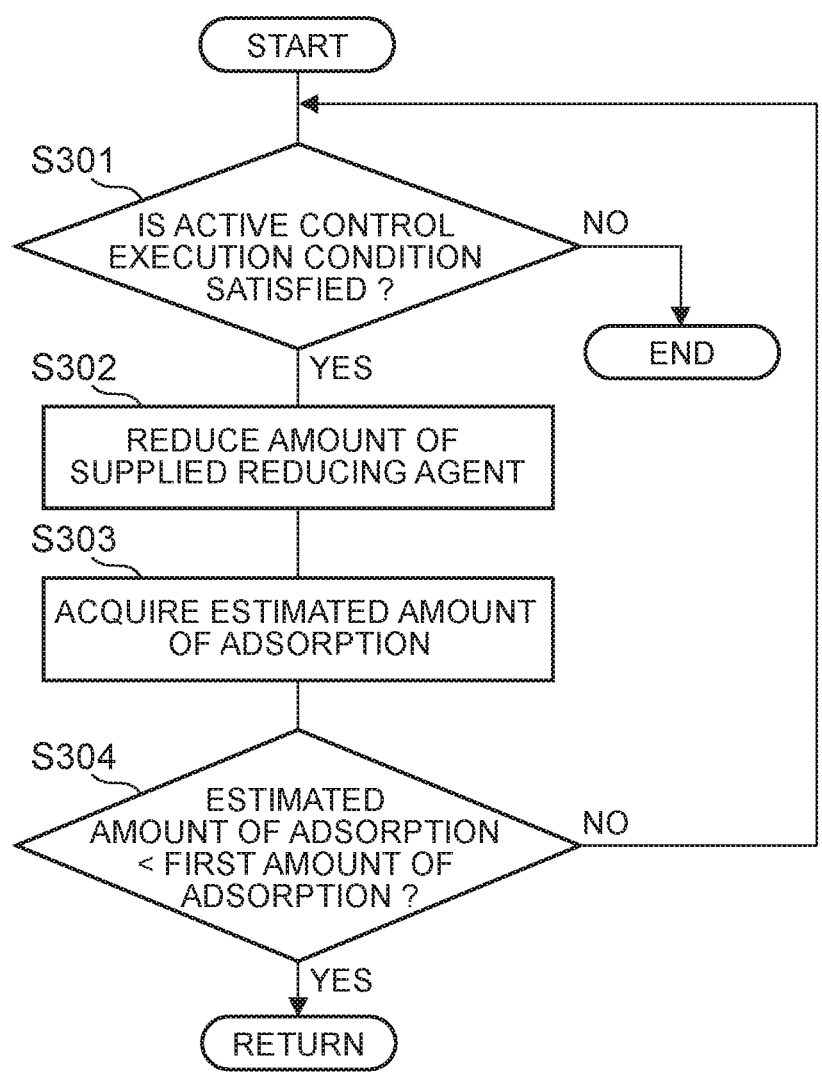
FIG. 20 is a flowchart that shows the process of active control regarding step S202.

FIG. 20 is a flowchart that shows the process of active control regarding step S202. The flowchart may be executed by the ECU 10 in step S202.

In step S301, it is determined whether an active control execution condition is satisfied. There is a case where the operating state of the internal combustion engine 1 changes and, as a result, it becomes difficult to execute active control. In such a case, it is also difficult to carry out a malfunction diagnosis of the addition valve 4, so active control is ended, and the flowchart shown in FIG. 19 is also ended.

When affirmative determination is made in step S301, the process proceeds to step S302. On the other hand, when negative determination is made in step S301, this flowchart and the flowchart shown in FIG. 19 are ended. In this case, a state where a malfunction diagnosis of the addition valve 4 is prohibited is kept.

In step S302, the amount of supplied reducing agent is reduced. In this flowchart, as shown in FIG. 14, the estimated amount of adsorption is moved into the first range by reducing the amount of supplied reducing agent. In step S302, the amount of reduction in the amount of supplied reducing agent may be set in response to the difference or ratio between the estimated amount of adsorption and the first amount of adsorption, or the amount of reduction in the amount of supplied reducing agent may be set for a predetermined amount. The amount of reduction in the amount of supplied reducing agent may be obtained in advance by experiment, simulation, or the like.

In step S303, the estimated amount of adsorption is acquired. The estimated amount of adsorption is acquired as in the case of step S101.

In step S304, it is determined whether the estimated amount of adsorption is smaller than the first amount of adsorption. The first amount of adsorption is obtained as in the case of step S102. In step S304, it is determined whether the estimated amount of adsorption falls within the first range as a result of a reduction in the amount of supplied reducing agent. When affirmative determination is made in step S304, the flowchart is ended. As a result of ending the flowchart, the process of step S202 in FIG. 19 completes, and the process returns to step S101. The estimated amount of adsorption falls within the first range, so the process may proceed to step S103 in which a malfunction diagnosis within the first range is carried out. On the other hand, when negative determination is made in step S304, the process returns to step S301, and the amount of supplied reducing agent is further reduced.

Figure 21:
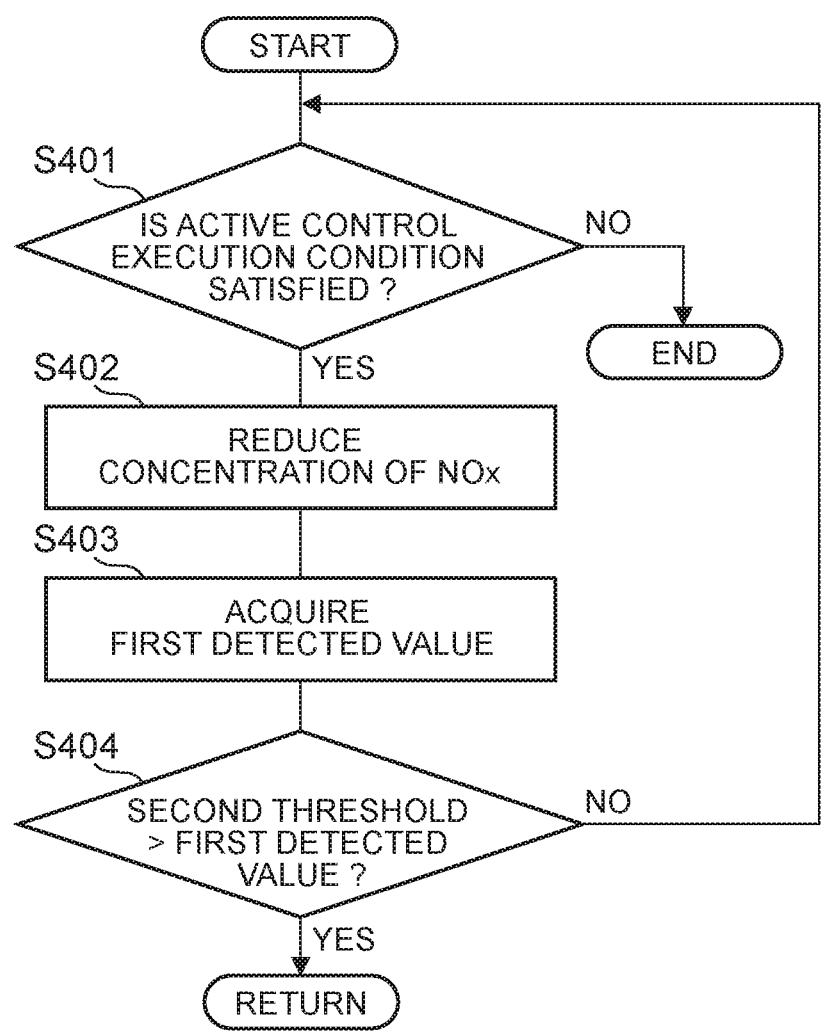
FIG. 21 is a flowchart that shows the process of active control regarding step S203.

Next, FIG. 21 is a flowchart that shows the process of active control regarding step S203. The flowchart may be executed by the ECU 10 in step S203.

In step S401, it is determined whether the active control execution condition is satisfied. There is a case where the operating state of the internal combustion engine 1 changes and, as a result, it may become difficult to execute active control. In such a case, it may also be difficult to carry out a malfunction diagnosis of the addition valve 4, so active control may be ended, and the flowchart shown in FIG. 19 may also be ended.

When affirmative determination is made in step S401, the process proceeds to step S402. On the other hand, when negative determination is made in step S401, this flowchart and the flowchart shown in FIG. 19 are ended.

In step S402, the concentration of NOx is reduced. In this flowchart, the concentration of NOx that is emitted from the internal combustion engine 1 may be reduced by, for example, increasing the amount of EGR gas. In this case, the concentration of NOx downstream of the NOx catalyst 3 may also reduce. Thus, as shown in FIG. 18, the first detected value decreases. In step S402, the amount of reduction in the concentration of NOx (that is, the amount of increase in EGR gas) may be set in response to the difference or ratio between the first detected value and the second threshold, or the amount of reduction in the concentration of NOx (that is, the amount of increase in EGR gas) may be set to a predetermined amount. The amount of reduction in the concentration of NOx or the amount of increase in EGR gas may be obtained in advance by experiment, simulation, or the like. The opening degree of the EGR valve 32 may be obtained and mapped in advance by experiment, simulation, or the like, and stored in the ECU 10.

In step S403, the first detected value is acquired. That is, the estimated detected sensor value at the time when the estimated amount of adsorption is zero is calculated. As a result of a reduction in the concentration of NOx, the estimated detected sensor value moves as indicated by the alternate long and two-short dashes line in FIG. 18. The estimated detected sensor value may be calculated by the ECU 10 as in the case described with reference to FIG. 3.

In step S404, it is determined whether the second threshold is larger than the first detected value. The second threshold is obtained as in the case of step S107. In step S404, it is determined whether the first detected value is smaller than the second threshold as a result of a reduction in the concentration of NOx. When affirmative determination is made in step S404, the flowchart is ended. As a result of ending the flowchart, the process of step S203 in FIG. 19 completes, and the process returns to step S101. When affirmative determination is made in step S404, the estimated amount of adsorption falls within the third range, so the estimated amount of adsorption may be acquired and then the process may proceed to step S107 in which a malfunction diagnosis within the third range is carried out. On the other hand, when negative determination is made in step S404, the process returns to step S401, and the concentration of NOx may be further reduced.

In the flowchart shown in FIG. 20, the amount of supplied reducing agent may be reduced in active control regarding step S202. Instead, the concentration of NOx in gas that is emitted from the internal combustion engine 1 may be increased as described with reference to FIG. 15.

Figure 22:
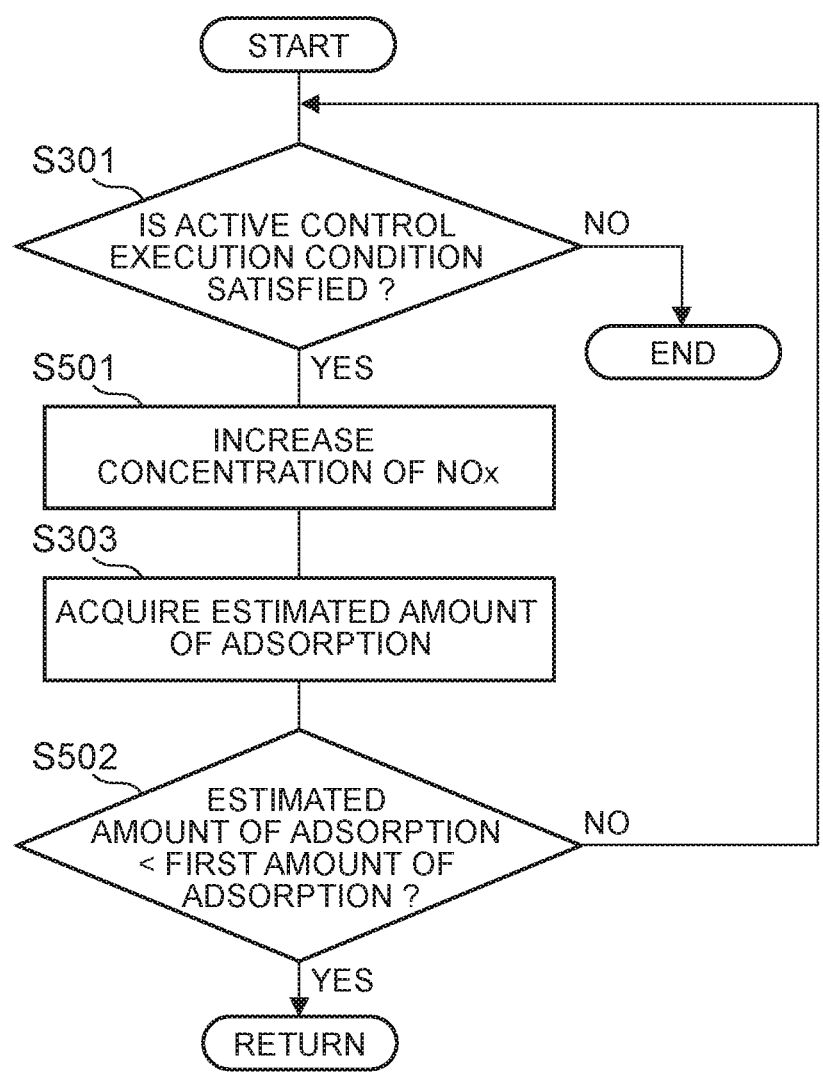
FIG. 22 is a flowchart that shows the process in the case where active control regarding step S202 is executed by increasing the concentration of NOx in gas that is emitted from the internal combustion engine.

FIG. 22 is a flowchart that shows the process in the case where active control regarding step S202 is executed by increasing the concentration of NOx in gas that is emitted from the internal combustion engine 1. The flowchart may be executed by the ECU 10 in step S202. Like step numbers denote steps in which the same processes as those of the above-described flowchart are executed, and the description thereof is omitted.

In the flowchart shown in FIG. 22, when affirmative determination is made in step S301, the process proceeds to step S501. In step S501, the concentration of NOx is increased. Thus, the estimated amount of adsorption may be caused to fall within the first range. The concentration of NOx that is emitted from the internal combustion engine 1 may be increased by, for example, reducing the amount of EGR gas. In this case, the concentration of NOx downstream of the NOx catalyst 3 may also increase. Thus, the first amount of adsorption may move toward an increasing side, so the estimated amount of adsorption falls within the first range.

In step S501, the amount of increase in the concentration of NOx (that is, the amount of reduction in EGR gas) may be set in response to the difference or ratio between the estimated amount of adsorption and the first amount of adsorption, or the amount of increase in the concentration of NOx (that is, the amount of reduction in EGR gas) may be set to a predetermined amount. The amount of increase in the concentration of NOx or the amount of reduction in EGR gas may be obtained in advance by experiment, simulation, or the like. The opening degree of the EGR valve 32 may be obtained and mapped in advance by experiment, simulation, or the like, and stored in the ECU 10.

In the flowchart shown in FIG. 22, when the process of step S303 completes, the process proceeds to step S502. In step S502, it is determined whether the estimated amount of adsorption is smaller than the first amount of adsorption. The first amount of adsorption may be obtained as in the case of step S102. In step S502, it is determined whether the estimated amount of adsorption falls within the first range as a result of an increase in the concentration of NOx. When affirmative determination is made in step S502, the flowchart is ended. As a result of ending the flowchart, the process of step S202 in FIG. 19 completes, and the process returns to step S101. The estimated amount of adsorption falls within the first range, so the process may proceed to step S103 in which a malfunction diagnosis within the first range is carried out. On the other hand, when negative determination is made in step S502, the process returns to step S301, and the concentration of NOx may be further reduced.

In the present embodiment, the amount of supplied reducing agent may be reduced in active control regarding step S202. Instead, the concentration of NOx in gas that is emitted from the internal combustion engine 1 may be reduced as described with reference to FIG. 16.

Figure 23:
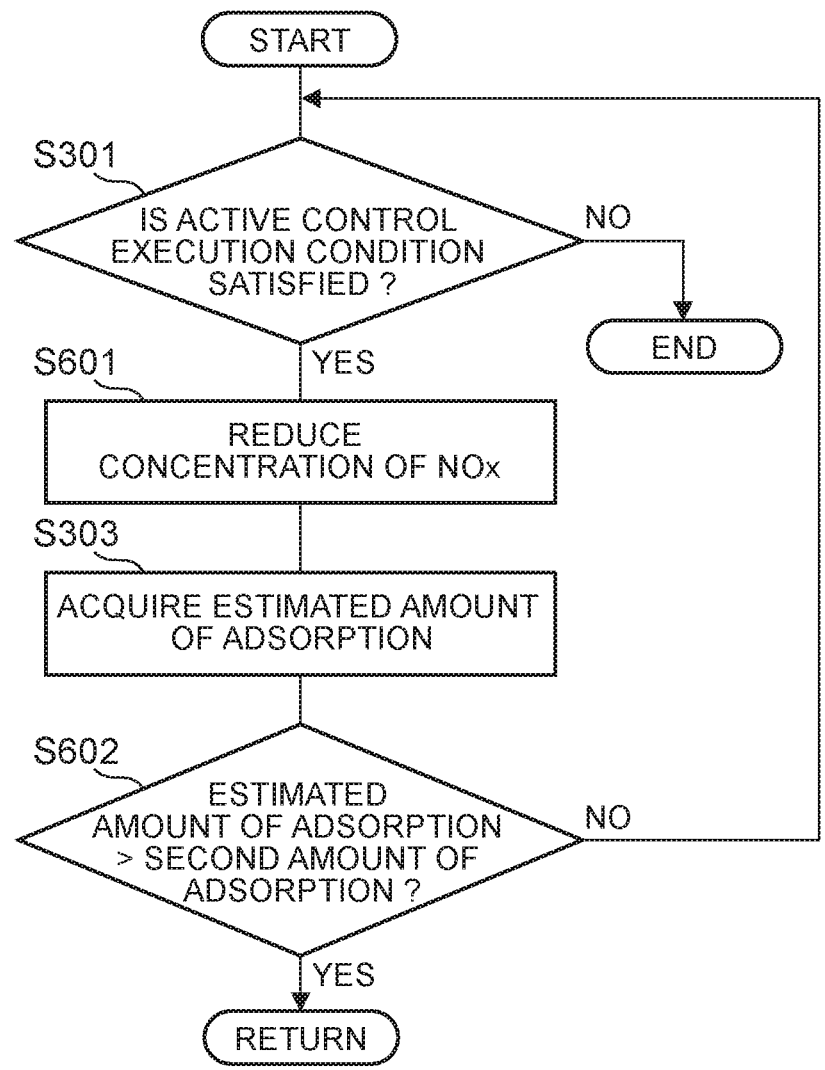
FIG. 23 is a flowchart that shows the process in the case where active control regarding step S202 is executed by reducing the concentration of NOx in gas that is emitted from the internal combustion engine.

FIG. 23 is a flowchart that shows the process in the case where active control regarding step S202 is executed by reducing the concentration of NOx in gas that is emitted from the internal combustion engine 1. Like step numbers denote steps in which the same processes as those of the above-described flowchart are executed, and the description thereof is omitted.

In the flowchart shown in FIG. 23, when affirmative determination is made in step S301, the process proceeds to step S601. In step S601, the concentration of NOx may be reduced. Thus, it is possible to cause the estimated amount of adsorption to fall within the third range. The concentration of NOx that is emitted from the internal combustion engine 1 may be reduced by, for example, increasing the amount of EGR gas. In this case, the concentration of NOx downstream of the NOx catalyst 3 may also reduce. Thus, the second amount of adsorption may move toward a reducing side. In this case, the positional relationship between the estimated amount of adsorption and the second amount of adsorption may change, so the estimated amount of adsorption falls within the third range.

In step S601, the amount of reduction in the concentration of NOx (that is, the amount of increase in EGR gas) may be set in response to the difference or ratio between the second amount of adsorption and the estimated amount of adsorption, or the amount of reduction in the concentration of NOx (that is, the amount of increase in EGR gas) may be set to a predetermined amount. The amount of reduction in the concentration of NOx or the amount of increase in EGR gas is obtained in advance by experiment, simulation, or the like. The opening degree of the EGR valve 32 may be obtained and mapped in advance by experiment, simulation, or the like, and stored in the ECU 10.

In the flowchart shown in FIG. 23, when the process of step S303 completes, the process proceeds to step S602. In step S602, it is determined whether the estimated amount of adsorption is larger than the second amount of adsorption. In step S602, it is determined whether the estimated amount of adsorption falls within the third range. The second amount of adsorption is obtained as in the case of step S106. In a state indicated by the alternate long and two-short dashes line in FIG. 16, the first detected value is zero. Therefore, when the estimated amount of adsorption is larger than zero, the estimated amount of adsorption may be presumed to be larger than the second amount of adsorption. That is, when the estimated amount of adsorption is larger than zero, the estimated amount of adsorption may be presumed to fall within the third range.

When affirmative determination is made in step S602, the flowchart is ended. As a result of ending the flowchart, the process of step S202 in FIG. 19 completes, and the process returns to step S101. When affirmative determination is made in step S602, the estimated amount of adsorption falls within the third range, so the process may proceed to step S201 in which a malfunction diagnosis within the third range is carried out. On the other hand, when negative determination is made in step S602, the process returns to step S601, and the concentration of NOx is reduced.

In the present embodiment, in active control regarding step S202, the amount of supplied reducing agent may be reduced. However, the amount of supplied reducing agent may be increased as described with reference to FIG. 14. That is, the estimated amount of adsorption may be moved into the third range.

Figure 24:
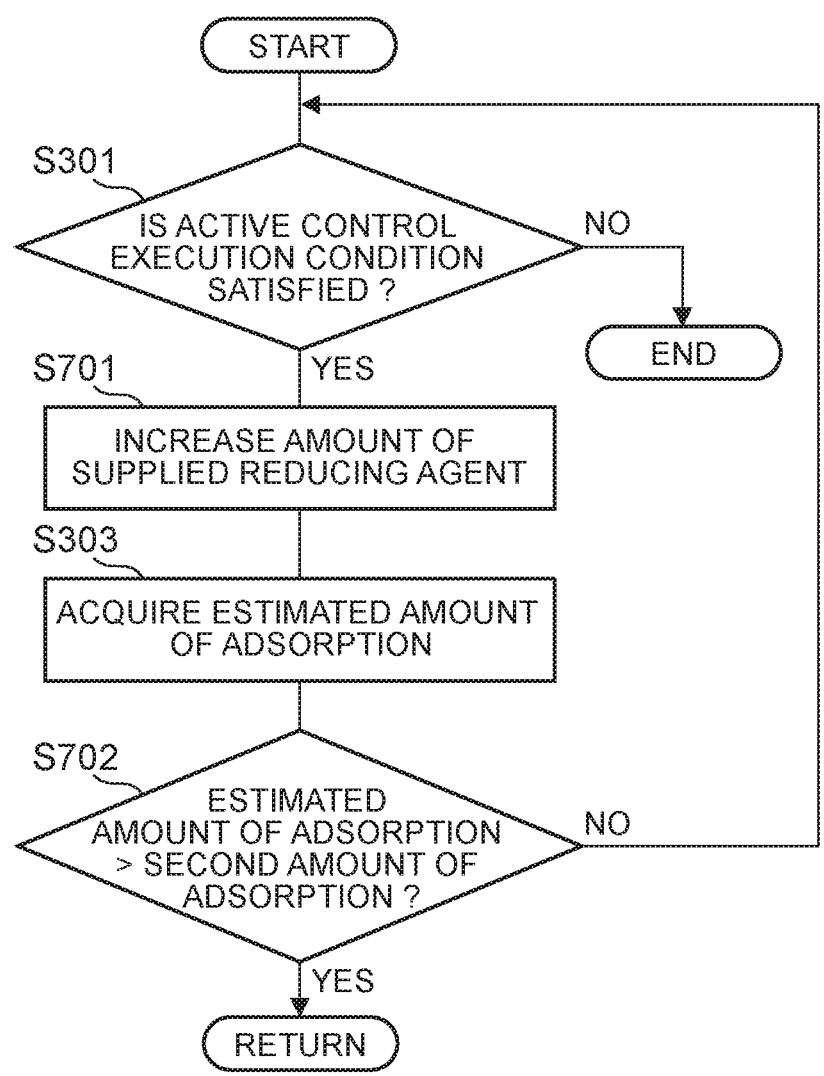
FIG. 24 is a flowchart that shows the process in the case where active control regarding step S202 is executed by increasing the amount of supplied reducing agent.

FIG. 24 is a flowchart that shows the process in the case where active control regarding step S202 is executed by increasing the amount of supplied reducing agent. Like step numbers denote steps in which the same processes as those of the above-described flowchart are executed, and the description thereof is omitted. In the flowchart shown in FIG. 24, when affirmative determination is made in step S301, the process proceeds to step S701.

In step S701, the amount of supplied reducing agent may be increased. In the flowchart, the estimated amount of adsorption is moved into the third range by increasing the amount of supplied reducing agent. In step S701, the amount of reduction in the amount of supplied reducing agent may be set in response to the difference or ratio between the second amount of adsorption and the estimated amount of adsorption, or the amount of increase in the amount of supplied reducing agent may be set to a predetermined amount. The amount of increase in the amount of supplied reducing agent may be obtained in advance by experiment, simulation, or the like.

In step S702, it is determined whether the estimated amount of adsorption is larger than the second amount of adsorption. The second amount of adsorption may be obtained as in the case of step S106. In step S702, it is determined whether the estimated amount of adsorption falls within the third range as a result of an increase in the amount of supplied reducing agent. When affirmative determination is made in step S702, the flowchart is ended. As a result of ending the flowchart, the process of step S202 in FIG. 19 completes. In this case, in FIG. 19, the process proceeds to step S101. At this time, the estimated amount of adsorption falls within the third range, so the process may proceed to step S201 in which a malfunction diagnosis within the third range is carried out.

As described above, according to the present embodiment, even when the estimated amount of adsorption falls within the second range, it is possible to increase an opportunity to carry out a malfunction diagnosis of the addition valve 4 by executing active control such that the estimated amount of adsorption falls outside the second range. When the estimated amount of adsorption falls within the third range and the second threshold is smaller than or equal to the first detected value, it is possible to increase an opportunity to carry out a malfunction diagnosis of the addition valve 4 by executing active control such that the second threshold becomes larger than the first detected value. A plurality of active controls may be combined with each other.

The invention claimed is:

1. A malfunction diagnosis apparatus for an exhaust emission control system of an internal combustion engine, the exhaust emission control system including
    a reducing agent supply device provided in an exhaust passage of the internal combustion engine, and configured to supply ammonia precursor or ammonia into the exhaust passage as reducing agent;
    a NOx selective catalytic reduction catalyst provided in the exhaust passage downstream of the reducing agent supply device in a flow direction of exhaust gas, and configured to selectively reduce NOx by using reducing agent that is adsorbed on the NOx selective catalytic reduction catalyst; and
    a NOx sensor provided in the exhaust passage downstream of the NOx selective catalytic reduction catalyst in the flow direction of exhaust gas, and configured to detect NOx and ammonia, the malfunction diagnosis apparatus comprising: an electronic control unit configured to:
    diagnose whether there is a malfunction in the reducing agent supply device based on a detected value of the NOx sensor;
    determine an estimated amount of adsorption when the reducing agent supply device is normal, the estimated amount of adsorption being an estimated amount of reducing agent adsorbed on the NOx selective catalytic reduction catalyst;
    determine a corresponding detected value, the corresponding detected value being a detected value of the NOx sensor, the detected value of the NOx sensor corresponding to the amount of reducing agent adsorbed on the NOx selective catalytic reduction catalyst; and
    prevent the diagnosis based on the detected value of the NOx sensor when the estimated amount of adsorption is larger than or equal to a first amount of adsorption and smaller than or equal to a second amount of adsorption, wherein the electronic control unit is configured to execute a first control for changing the corresponding detected value or the estimated amount of adsorption by changing at least one of the concentration of NOx in exhaust gas flowing into the NOx selective catalytic reduction catalyst or the amount of reducing agent supplied from the reducing agent supply device, when the diagnosis based on the detected value of the NOx sensor has been prevented.

2. The malfunction diagnosis apparatus according to claim 1, wherein
    the first amount of adsorption is an amount of adsorbed reducing agent corresponding to a minimum value of the corresponding detected value, and the second amount of adsorption is an amount of adsorbed reducing agent corresponding to a detected value that is a first detected value, the first detected value being the corresponding detected value when the amount of adsorbed reducing agent is zero.

3. The malfunction diagnosis apparatus according to claim 1, wherein
    the second amount of adsorption is an amount of adsorbed reducing agent larger than the first amount of adsorption.

4. The malfunction diagnosis apparatus according to claim 3, wherein
    the electronic control unit is configured to set a value smaller than the detected value of the NOx sensor,
    the detected value of the NOx sensor corresponds to the estimated amount of adsorption, as a threshold, when the estimated amount of adsorption is larger than the second amount of adsorption, and
    the electronic control unit is configured to diagnose the reducing agent supply device as malfunctioning when the detected value of the NOx sensor is smaller than or equal to the threshold.

5. The malfunction diagnosis apparatus according to claim 4, wherein
    the electronic control unit is configured to prevent the diagnosis based on the detected value of the NOx sensor when the estimated amount of adsorption is larger than the second amount of adsorption and the threshold is smaller than or equal to the first detected value.

6. The malfunction diagnosis apparatus according to claim 3, wherein
the electronic control unit is configured to diagnose the reducing agent supply device as malfunctioning when the estimated amount of adsorption is larger than the second amount of adsorption and the detected value of the NOx sensor is smaller than or equal to the first detected value.

7. The malfunction diagnosis apparatus according to claim 3, wherein
the electronic control unit is configured to permit the diagnosis based on the detected value of the NOx sensor when the estimated amount of adsorption becomes smaller than the first amount of adsorption or becomes larger than the second amount of adsorption as a result of executing the first control.

8. The malfunction diagnosis apparatus according to claim 3, wherein
the electronic control unit is configured to determine the corresponding detected value based on an amount of reducing agent flowing out from the NOx selective catalytic reduction catalyst, an amount of NOx flowing into the NOx selective catalytic reduction catalyst, a temperature of the NOx selective catalytic reduction catalyst, an amount of reducing agent adsorbed on the NOx selective catalytic reduction catalyst, and an exhaust gas flow rate.

9. The malfunction diagnosis apparatus according to claim 1, wherein the electronic control unit is configured to permit the diagnosis based on the detected value of the NOx sensor when the threshold becomes larger than the first detected value as a result of executing the first control.

10. A malfunction diagnosis method for an exhaust emission control system of an internal combustion engine, the method comprising:
diagnosing, by an electronic control unit, whether there is a malfunction in a reducing agent supply device based on a detected value of a NOx sensor,
wherein the reducing agent supply device is provided in an exhaust passage of the internal combustion engine, and configured to supply ammonia precursor or ammonia into the exhaust passage as reducing agent,
the NOx sensor is provided in the exhaust passage downstream of a NOx selective catalytic reduction catalyst in the flow direction of exhaust gas, and configured to detect NOx and ammonia, and
the NOx selective catalytic reduction catalyst is provided in the exhaust passage downstream of the reducing agent supply device in a flow direction of exhaust gas, and configured to selectively reduce NOx by using reducing agent that is adsorbed on the NOx selective catalytic reduction catalyst;
determining, by the electronic control unit, an estimated amount of adsorption when the reducing agent supply device is normal, wherein the estimated amount of adsorption is an estimated amount of reducing agent adsorbed on the NOx selective catalytic reduction catalyst;
determining, by the electronic control unit, a corresponding detected value, the corresponding detected value being a detected value of the NOx sensor, the detected value of the NOx sensor corresponding to the amount of reducing agent adsorbed on the NOx selective catalytic reduction catalyst;
preventing, by the electronic control unit, the diagnosis based on the detected value of the NOx sensor when the estimated amount of adsorption is larger than or equal to a first amount of adsorption and smaller than or equal to a second amount of adsorption; and
executing, by the electronic control unit, a first control for changing the corresponding detected value or the estimated amount of adsorption by changing at least one of the concentration of NOx in exhaust gas flowing into the NOx selective catalytic reduction catalyst or the amount of reducing agent supplied from the reducing agent supply device, when the diagnosis based on the detected value of the NOx sensor has been prevented.

11. The method according to claim 10, wherein
the first amount of adsorption is an amount of adsorbed reducing agent corresponding to a minimum value of the corresponding detected value, and
the second amount of adsorption is an amount of adsorbed reducing agent corresponding to a detected value that is a first detected value, the first detected value being the corresponding detected value when the amount of adsorbed reducing agent is zero.

12. The method according to claim 10, wherein
the second amount of adsorption is an amount of adsorbed reducing agent larger than the first amount of adsorption.

13. The method according to claim 12, further comprising
setting, by the electronic control unit, a value smaller than the detected value of the NOx sensor, wherein the estimated amount of adsorption is a threshold;
comparing, by the electronic control unit, the detected value of the NOx sensor to the threshold when the estimated amount of adsorption is larger than the second amount of adsorption, and
diagnosing, by the electronic control unit, the reducing agent supply device as malfunctioning when the detected value of the NOx sensor is smaller than or equal to the threshold.

14. The method according to claim 13, further comprising
preventing, by the electronic control unit, the diagnosis based on the detected value of the NOx sensor when the estimated amount of adsorption is larger than the second amount of adsorption.

15. The method according to claim 12, further comprising
diagnosing, by the electronic control unit, the reducing agent supply device as malfunctioning when the estimated amount of adsorption is larger than the second amount of adsorption and the detected value of the NOx sensor is smaller than or equal to the first detected value.

16. The method according to claim 12, further comprising
permitting, by the electronic control unit, the diagnosis based on the detected value of the NOx sensor when the estimated amount of adsorption becomes smaller than the first amount of adsorption or becomes larger than the second amount of adsorption as a result of executing the first control.

17. The method according to claim 12, further comprising
determining, by the electronic control unit, the corresponding detected value based on an amount of reducing agent flowing out from the NOx selective catalytic reduction catalyst, an amount of NOx flowing into the NOx selective catalytic reduction catalyst, a temperature of the NOx selective catalytic reduction catalyst, an amount of reducing agent adsorbed on the NOx selective catalytic reduction catalyst, and an exhaust gas flow rate.

18. The method according to claim 10, further comprising permitting, by the electronic control unit, the diagnosis based on the detected value of the NOx sensor when the threshold becomes larger than the first detected value as a result of executing the first control.

* * * * *